(12) United States Patent
Pei et al.

(10) Patent No.: US 8,530,594 B2
(45) Date of Patent: Sep. 10, 2013

(54) COPOLYMERS OF ALKOXYTHIOPHENE

(75) Inventors: Qibing Pei, Calabasas, CA (US); Yang Yang, Los Angeles, CA (US); Chenjun Shi, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 1311 days.

(21) Appl. No.: 12/210,468

(22) Filed: Sep. 15, 2008

(65) Prior Publication Data

US 2009/0095343 A1    Apr. 16, 2009

Related U.S. Application Data

(63) Continuation of application No. PCT/US2007/064179, filed on Mar. 16, 2007.

(60) Provisional application No. 60/783,580, filed on Mar. 16, 2006.

(51) Int. Cl.
    *C08G 61/12* (2006.01)
(52) U.S. Cl.
    USPC ............................ 526/256; 526/257; 136/252
(58) Field of Classification Search
    USPC .................................. 526/256, 257; 136/252
    See application file for complete search history.

(56) References Cited

U.S. PATENT DOCUMENTS

| 6,897,284 B2 | 5/2005 | Liu et al. | |
| 2004/0186265 A1* | 9/2004 | Liu et al. | 528/377 |
| 2006/0076050 A1* | 4/2006 | Williams et al. | 136/263 |

OTHER PUBLICATIONS

Sheina et al. (Highly Conductive, Regioregular Alkoxy-Functionalized Polythiophenes—A New Class of Stable, Low Band Gap Materials; Chemistry of Materials vol. 17, No. 13 Jun. 28, 2005, p. 3317-3319).*
Koeckelberghs et al. (Regioregular Poly(3-alkoxythiophene)s: Toward Soluble, Chiral Conjugated Polymers with a Stable Oxidized State Guy Koeckelberghs, Macromolecules Jun. 1, 2005, 38, 5554-5559).*
Koeckelberghs et al.—"Regioregular(3-alkoxythiophene)s: Toward Soluble, Chiral Conjugated Polymers with a Stable Oxidized State"—Macromolecule (2005), 38(13), 5554-5559.
Koeckelberghs et al.—"Poly(N-alkylthienopyrroles) and Regioregular poly(3-alkoxythiophene)s: Towards Soluble, Chiral, Conjugated Polymers with a Stable Oxidized State"—PMSE Preprints (2005), 92, 219-220.
Sheina et al. "Highly Conductive, Regioregular Alkoxy-Functionalized Polythiophenes: A New Class of Stable, Low Band Gap Materials"—Chemistry of Materials (Jun. 2005), 17(13), 3317-3319.
PCT/US07/64179, International Search Report and Written Opinion, Jul. 30, 2008.

* cited by examiner

*Primary Examiner* — Ling Choi
*Assistant Examiner* — Chun-Cheng Wang
(74) *Attorney, Agent, or Firm* — John P. O'Banion

(57) ABSTRACT

The synthesis, characterization, optical and electrochemical properties of a regioregular copolymer, poly(3-octylthiophene-2,5-diyl-co-3-decyloxythiophene-2,5-diyl) (POT-co-DOT), and an alternating regioregular copolymer poly{(9, 9-dioctylfluorene)-2,7-diyl-alt-[4,7-bis(3-decyloxythien-2-yl)-2,1,3-benzothiadiazole]-5',5"-diyl} (PF-co-DTB) is disclosed. The incorporation of 3-alkoxythiophene units onto the conjugated backbones enhances the electron-donating property of the polymer and lowers its bandgap. The fabrication and performance of photovoltaic cells with bulk heterojunction architecture based on blends of these copolymers with PCBM are also described.

2 Claims, 10 Drawing Sheets

COPOLYMERS OF ALKOXYTHIOPHENE

CROSS-REFERENCE TO RELATED APPLICATIONS

This application claims priority from, and is a 35 U.S.C. §111(a) continuation of, co-pending PCT international application serial number PCT/US2007/064179, filed on Mar. 16, 2007, incorporated herein by reference in its entirety, which claims priority from U.S. provisional application Ser. No. 60/783,580, filed on Mar. 16, 2006, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to the synthesis of copolymers of 3-alkoxythiophene, and more particularly to the use of regioregular copolymers of 3-alkoxythiophene in photovoltaic applications.

2. Description of Related Art

Conjugated polymers have been developed into useful materials for a variety of applications, including light-emitting diodes, photovoltaic cells (PVs),[3-5] and thin-film transistors (TFTs). In the past few years, photovoltaic devices based on conjugated polymers have been extensively studied. The most widely used configuration of polymer solar cells is the so-called "bulk heterojunction" devices in which the active layer consists of a blend of an electron-donating materials, e.g., a p-type conjugated polymer, and an electron-accepting (n-type) material such as (6,6)-phenyl $C_{61}$-butyric acid methyl ester (PCBM). Photo-induced charge transfer from a conjugated polymer to PCBM with quantum yields up to 100% has been obtained. Regioregular poly(3-alkylthiophene)s (P3ATs) have been found to be one of the most promising conjugated polymers. They can be used as photosensitizers and hole transporters in bulk heterojunction polymer solar cells. Power conversion efficiencies (PCE) exceeding 3% under AM1.5 G illumination and between 4 and 5% under white light illumination from a solar simulator have recently been reported. Further improvement on the PCE entails new conjugated polymers with higher carrier mobility and broader absorption of the solar spectrum, especially in the red and infrared range. Moreover, the relatively low PCE of the polymer cells is largely due to low open-circuit voltage (Voc). The maximum open-circuit voltage is limited by the difference between the electronegativity, i.e., the lowest unoccupied molecular orbital (LUMO) of PCBM and the polymer's ionization potential, i.e., the highest occupied molecular orbital (HOMO). Therefore, HOMO level is also an important parameter to consider when designing new, electron-donating polymers of low bandgap.

Polythiophenes with substituents other than alkyl groups have also been investigated, among which those with electron-donating alkoxy groups have displayed promising electronic and optical properties. Compared to P3ATs, the incorporation of an alkoxy group to the 3-position of the thiophene ring yields poly(3-alkoxythiophenes) (P3AOTs) with optical absorption maxima at longer wavelength. This may be attributed to both the electron-donating effect of alkoxy group and the more coplanar conformation of the P3AOTs. Therefore, polymers and copolymers based on 3-alkoxythiophene may also have smaller bandgaps than those based on P3ATs, and they can more efficiently absorb the red and near infrared portion of the solar emission spectrum.

Efforts to synthesize new conjugated polymers for photovoltaic application have been undertaken, beginning with regioregular poly(3-decyloxythiophene-2,5-diyl) (P3DOT), but it was found that thin films of P3DOT did not have sufficiently high uniformity and environmental stability.

BRIEF SUMMARY OF THE INVENTION

Low bandgap conjugated polymers with proper energy levels for charge transfer are required in order to achieve high-efficiency polymer solar cells. We report the synthesis and characterization of two new regioregular copolymers that are based on 3-alkoxythiophene monomers: poly(3-octylthiophene-2,5-diyl-co-3-decyloxythiophene-2,5-diyl) (POT-co-DOT) and poly{(9,9-dioctylfluorene)-2,7-diyl-alt-[4,7-bis(3-decyloxythien-2-yl)-2,1,3-benzothiadiazole]-5',5"-diyl} (PF-co-DTB). Compared to the alkyl substituents, the alkoxy side chains on the thiophene units can effectively lower the bandgap of copolymers and enhance the charge transfer to electron acceptors such as (6,6)-phenyl $C_{61}$-butyric acid methyl ester (PCBM). The chemical structure and regioregularity of the copolymers were confirmed by NMR. Both copolymers are readily soluble in organic solvents and form high-quality thin films. Electrochemical and photophysical studies reveal bandgaps of 1.64 eV for POT-co-DOT and 1.78 eV for PF-co-DTB. Bulk heterojunction photovoltaic devices were fabricated using blends of these copolymers with PCBM as the active layer, ITO-glass as the anode, and aluminum as the cathode. Power conversion efficiency of 1.6% is obtained under simulated solar light AM 1.5 G (100 mW/cm$^2$) from a solar cell with an active layer containing 20 wt % PF-co-DTB and 80 wt % PCBM. Regioregular poly(3-decyloxythiophene-2,5-diyl) is also studied for comparison purposes.

An aspect of the invention is a polymer having a constituent unit comprising:

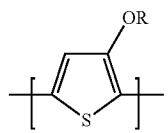

wherein the R group is selected from a group consisting of an alkyl substituent, a substituted alkyl substituent, and a polyethyleneoxide chain.

Another aspect of the invention is a regioregular copolymer having a constituent unit comprising:

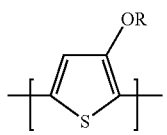

wherein the R group is selected from a group consisting of an alkyl substituent, a substituted alkyl substituent, and a polyethyleneoxide chain.

A still further aspect of the invention is a regioregular copolymer having a constituent unit comprising:

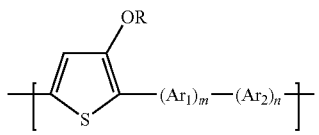

wherein R is selected from a group consisting of an alkyl substituent, a substituted alkyl substituent, and a polyethyleneoxide chain; $Ar_1$ is selected from a group consisting of an aryl moiety and a derivatized aryl moiety; $Ar_2$ is selected from a group consisting of an aryl moiety and a derivatized aryl moiety; m=0 to 3; and n=0 to 2.

Yet another aspect of the invention is a regioregular copolymer having a constituent unit comprising:

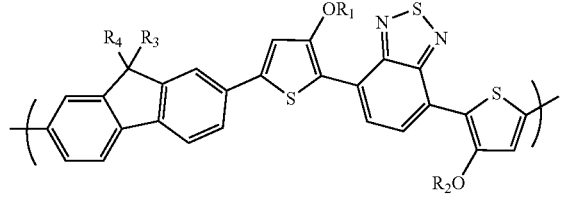

wherein $R_1$ is selected from a group consisting of an alkyl substituent, a substituted alkyl substituent, and a polyethyleneoxide chain; $R_2$ is selected from a group consisting of an alkyl substituent, a substituted alkyl substituent, and a polyethyleneoxide chain; $R_3$ is selected from a group consisting of an alkyl substituent, a substituted alkyl substituent, an alkoxy substituent, a substituted alkoxy substituent, and a polyethyleneoxide chain; and $R_4$ is selected from a group consisting of an alkyl substituent, a substituted alkyl substituent, an alkoxy substituent, a substituted alkoxy substituent, and a polyethyleneoxide chain.

In one embodiment of this aspect, both $R_1$ and $R_2$ are polyethyleneoxide chains. In another embodiment of this aspect, both $R_1$ and $R_2$ are selected from a group consisting of an alkyl substituent and a substituted alkyl substituent. In another embodiment of this aspect, both $R_3$ and $R_4$ are alkyl substituents.

Another aspect of the invention is a regioregular copolymer having a constituent unit comprising:

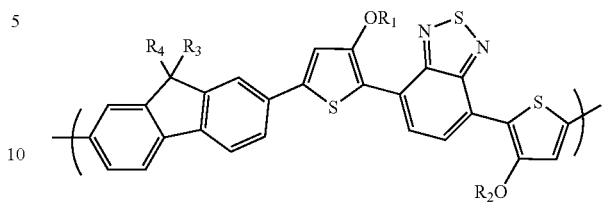

wherein $R_1$ is a polyethyleneoxide chain; $R_2$ is a polyethyleneoxide chain; $R_3$ is an alkyl substituent; and $R_4$ is an alkyl substituent.

Another aspect of the invention is a regioregular copolymer having a constituent unit comprising:

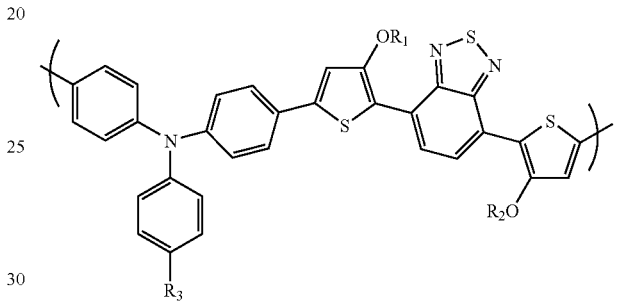

wherein $R_1$ is selected from a group consisting of an alkyl substituent, a substituted alkyl substituent, and a polyethyleneoxide chain; $R_2$ is selected from a group consisting of an alkyl substituent, a substituted alkyl substituent, and a polyethyleneoxide chain; and $R_3$ is selected from a group consisting of an alkyl substituent, a substituted alkyl substituent, an alkoxy substituent, a substituted alkoxy substituent, and a polyethyleneoxide chain.

In one embodiment of this aspect, $R_1$ and $R_2$ are selected from a group consisting of an alkyl substituent and a substituted alkyl substituent and $R_3$ is selected from a group consisting of an alkoxy substituent and a substituted alkoxy substituent.

A still further aspect of the invention is a regioregular copolymer having a constituent unit comprising:

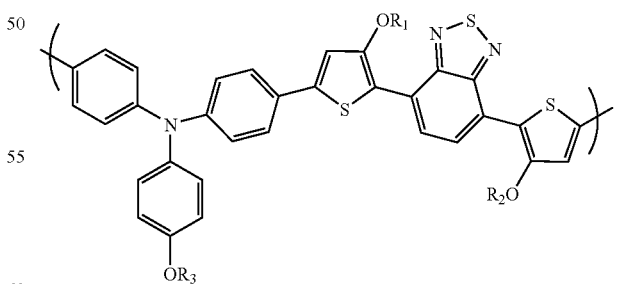

wherein $R_1$, $R_2$, and $R_3$ are selected from a group consisting of an alkyl substituent, a substituted alkyl substituent, and a polyethyleneoxide chain.

In one embodiment of this aspect, $R_1$, $R_2$, and $R_3$ are selected from a group consisting of an alkyl substituent and a substituted alkyl substituent.

Another aspect of the invention is a polymer having a constituent unit comprising:

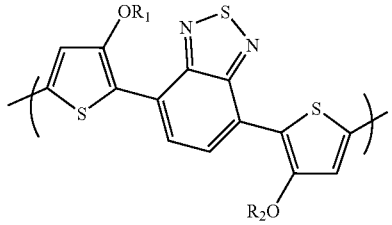

wherein $R_1$ and $R_2$ are selected from a group consisting of an alkyl substituent, a substituted alkyl substituent, and a polyethyleneoxide chain.

In one embodiment of this aspect, $R_1$ and $R_2$ are selected from a group consisting of an alkyl substituent and a substituted alkyl substituent. In another embodiment of this aspect, $R_1$ and $R_2$ are both alkyl substituents.

Another aspect of the invention is a regioregular copolymer having a constituent unit comprising:

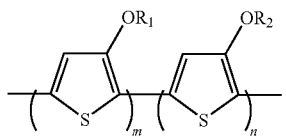

wherein $R_1$ is selected from a group consisting of an alkyl substituent, a substituted alkyl substituent, an alkoxy substituent, a substituted alkoxy substituent, and a polyethyleneoxide chain; $R_2$ is selected from a group consisting of an alkyl substituent, a substituted alkyl substituent, and a polyethyleneoxide chain; and m and n are the number of repeat units for each derivatized thiophene moiety.

In one embodiment of this aspect, $R_1$ is selected from a group consisting of an alkyl substituent and a substituted alkyl substituent and $R_2$ is selected from a group consisting of an alkyl substituent and a substituted alkyl substituent.

Another aspect of the invention is polymers containing derivatized thiophene moieties for use in photovoltaic applications, wherein the polymers contain a constituent unit comprising:

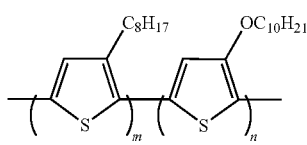

wherein m and n are the number of repeat units for each derivatized thiophene moiety.

Another aspect of the invention is polymers containing derivatized thiophene moieties for use in photovoltaic applications, wherein the polymers contain a constituent unit comprising:

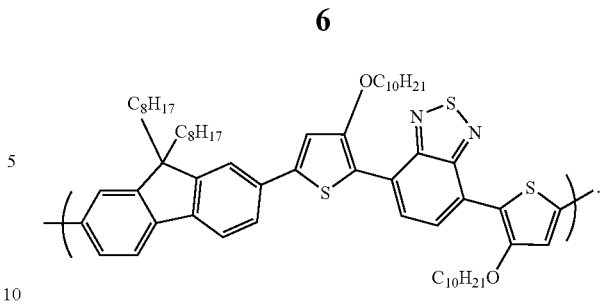

Another aspect of the invention is a polymer photovoltaic device comprising: an anode; a cathode; and a polymer film sandwiched between the anode and cathode, wherein the polymer film contains:

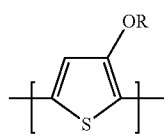

wherein R group is selected from a group consisting of an alkyl substituent, a substituted alkyl substituent, and a polyethyleneoxide chain.

Another aspect of the invention is a polymer photovoltaic device comprising: an anode; a cathode; and a polymer film sandwiched between the anode and cathode, wherein the polymer film contains:

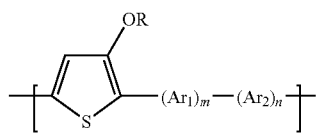

wherein R is selected from a group consisting of an alkyl substituent, a substituted alkyl substituent, and a polyethyleneoxide chain; $Ar_1$ is selected from a group consisting of an aryl moiety and a derivatized aryl moiety; $Ar_2$ is selected from a group consisting of an aryl moiety and a derivatized aryl moiety; m=0 to 3; and n=0 to 2.

Another aspect of the invention is a polymer photovoltaic device comprising: an anode; a cathode; and a polymer film sandwiched between the anode and cathode, wherein the polymer film contains:

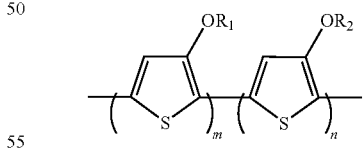

wherein $R_1$ is selected from a group consisting of an alkyl substituent, a substituted alkyl substituent, an alkoxy substituent, a substituted alkoxy substituent, and a polyethyleneoxide chain; $R_2$ is selected from a group consisting of an alkyl substituent, a substituted alkyl substituent, and a polyethyleneoxide chain; and m and n are the number of repeat units for each derivatized thiophene moiety.

Another aspect of the invention is a polymer photovoltaic device comprising: an anode; a cathode; and a polymer film sandwiched between the anode and cathode, wherein the polymer film contains:

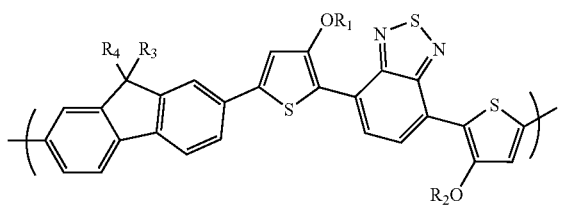

wherein $R_1$ is selected from a group consisting of an alkyl substituent, a substituted alkyl substituent, and a polyethyleneoxide chain; $R_2$ is selected from a group consisting of an alkyl substituent, a substituted alkyl substituent, and a polyethyleneoxide chain; $R_3$ is selected from a group consisting of an alkyl substituent, a substituted alkyl substituent, an alkoxy substituent, a substituted alkoxy substituent, and a polyethyleneoxide chain; and $R_4$ is selected from a group consisting of an alkyl substituent, a substituted alkyl substituent, an alkoxy substituent, a substituted alkoxy substituent, and a polyethyleneoxide chain.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1A:
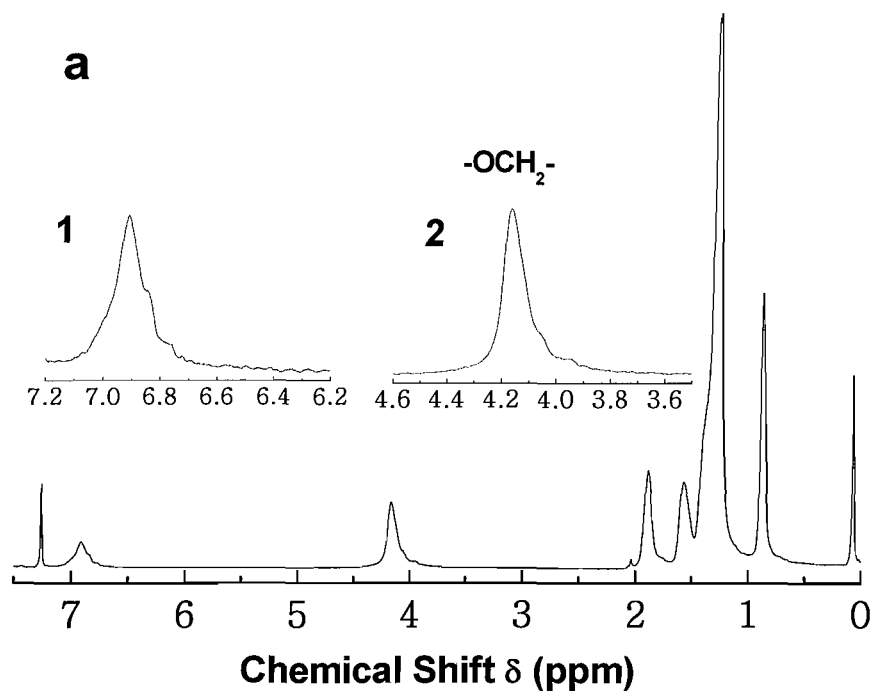
FIG. 1A is the $^1$H-NMR spectra of P3DOT, also showing (1) the aromatic region, and (2) the —OCH$_2$— region.
Figure 1B:
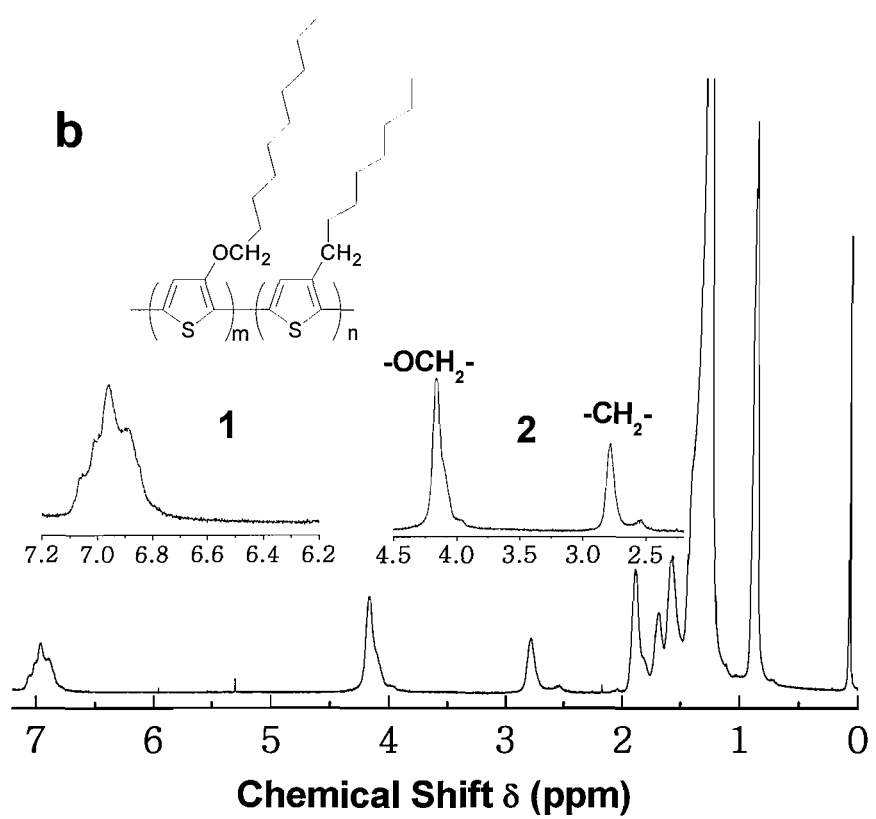
FIG. 1B is the $^1$H-NMR spectra of POT-co-DOT, also showing (1) the aromatic region, and (2) the —OCH$_2$— and —CH$_2$— adjoining thiophene rings.
Figure 2:
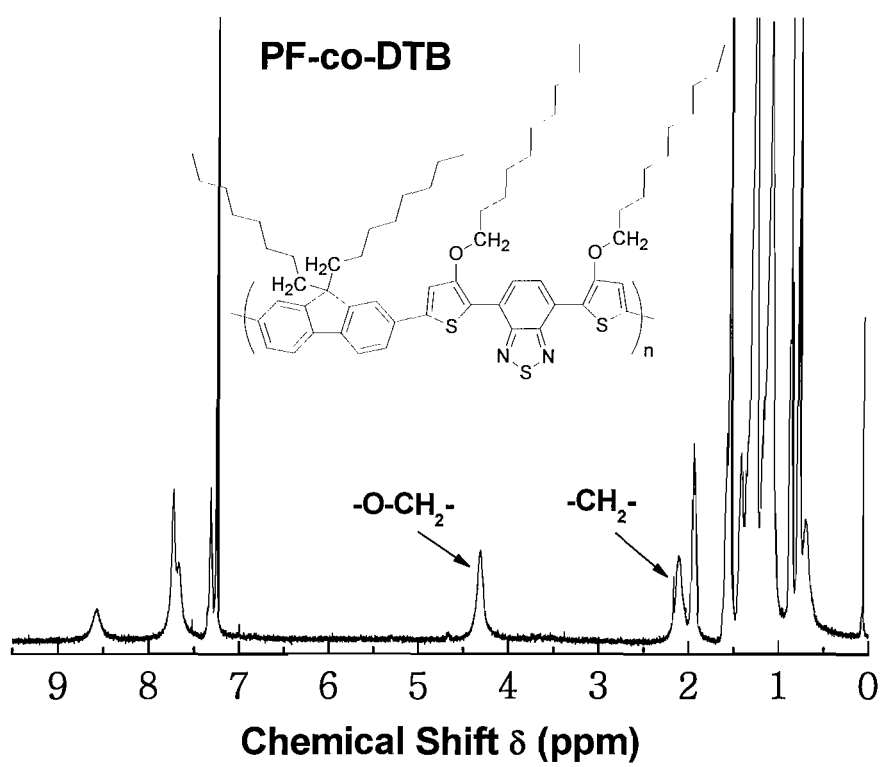
FIG. 2 is the $^1$H-NMR spectra and chemical structure of PF-co-DTB.

Referring more specifically to the drawings, for illustrative purposes the present invention is embodied in the apparatus generally shown in FIG. 1A through FIG. 7. It will be appreciated that the apparatus may vary as to configuration and as to details of the parts, and that the method may vary as to the specific steps and sequence, without departing from the basic concepts as disclosed herein.

1. EXPERIMENT

1.1. Measurement and Characterization $^1$H and $^{13}$C NMR spectra were recorded on Varian Inova 500 or Bruker DRX 400 in deuterated chloroform solution. Number-average (Mn) and weight-average (Mw) molecular weights were determined by a gel permeation chromatography (GPC) using a Varian Prostar Solvent Dilvery Module 230, UV-Vis detector 340. Samples were filtered through a 0.2 μm PTFE filter membrane prior to injection. Three 300 mm Waters Stryragel HR columns were calibrated with polystyrene standards using THF as the eluent with a flow rate of 1.0 mL/min. The elemental analysis was performed on Vario EL elemental analysis instrument (ELEMENTAR Co.). UV-Vis absorption spectra were recorded on a Varian Cary 50 spectrophotometer.

Using a CHI660A electrochemical workstation, cyclic voltammetry was measured in a 0.1M tetrabutylammonium tetrafluoroborate (Bu$_4$N.BF$_4$) acetonitrile (CH$_3$CN) solution as supporting electrolyte. The working electrode was a Pt disk (0.2 cm$^2$), the counter electrode was a Pt wire, and a saturated calomel electrode was used as the reference electrode, calibrated against Fc/Fc$^+$.

1.2. Synthesis of Monomers and Polymers

All procedures involving air-sensitive reagents were performed under an atmosphere of dry argon. 9,9-Dioctylfluorene-2,7-bis(trimethyleneborate) (DOF), THF (anhydrous), DMF (anhydrous), 3-Bromothiophene, 1-Decanol, and Ni(dppp)Cl$_2$, etc. were purchased from Aldrich and were used without further purification. 3-octylthiophene, 2,5-dibromo-3-octylthiophene and 4,7-dibromo-2,1,3-benzothiadiazole were prepared according to the published procedures and have been described elsewhere.

3-Decyloxythiophene was synthesized as follows. 1-Decanol (0.51 mol, 80.27 g) was added dropwise to 3.5 g (0.15 mol) of sodium metal. After complete disappearance of sodium, the residual alcohol was removed in vacuum and the remaining solid was dissolved in 20~30 ml DMF. After the solution was heated to 110° C., 12.2 g (0.075 mol) of 3-bromo-thiophene and 1.0 g (0.00053 mol) of copper (I) iodide were added. After 16 hrs of stirring at 110° C., the mixture was poured into water and extracted with ether three times. The filtrate was concentrated in vacuo and the yellow oily residue was chromatographed on a silica column using hexane as the eluent to yield 15.5 g of yellow liquid (86% yield). Mw=240.4. Element Anal. Calcd for $C_{14}H_{24}SO$: C, 69.94; H, 10.06; 0, 6.66; S, 13.34. Found: C, 69.90; H, 10.00; 0, 6.64; S, 13.30.

$^1$H-NMR: δ=7.17 (d, 1H), 6.77 (d, 1H), 6.23 (d, 1H), 3.96 (t, 2H, —OCH$_2$), 1.75 (2H, β-H) 1.45~1.27 (m, 14H, 7CH$_2$), 0.9 (t, 3H, —CH$_3$)

$^{13}$C-NMR: δ=129.10, 124.51, 119.55, 96.94, 70.29, 31.91, 29.67, 29.64, 29.60, 29.58, 29.36, 26.06, 22.70, 14.13

2-Bromo-3-decyloxythiophene (5)

3-decyloxy-thiophene (5.50 g, 0.023 mol) was dissolved in CHCl$_3$ (50 mL) under argon atmosphere. N-Bromosuccinimide (NBS) (4.09 g, 0.023 mol) was added to the solution as one portion. The mixture was reacted under argon and protected from light for 4~8 hours at room temperature (25° C.). Afterwards it was distilled to remove CHCl$_3$, allowed to cool to room temperature, and diluted with hexane (100 mL). The mixture was filtered and the filtrate was concentrated in vacuum. The residue was applied to silica gel, eluted with 1:9 ethyl acetate/hexane to give 6.97 g (94% yield) of light yellow liquid. Mw=319.30. Element Anal. Calcd. for $C_{14}H_{23}BrOS$: C, 52.66; H, 7.26; Br, 25.02; 0, 5.01; S, 10.04. Found: C, 52.62; H, 7.25; Br, 24.90; 0, 5.09; S, 10.04.

$^1$H-NMR (CDCl$_3$): δ=7.16 (d, 1H), 6.75 (d, 1H), 4.01 (t, 2H, —OCH$_2$), 1.75 (2H, β-H) 1.45-1.27 (m, 14H, 7CH$_2$), 0.9 (t, 3H, —CH$_3$)

$^{13}$C-NMR: δ=129.10, 124.12, 117.53, 91.60, 72.27, 31.91, 29.57, 29.56, 29.49, 29.35, 29.33, 25.83, 22.70, 14.14

2,5-Dibromo-3-decyloxythiophene

N-Bromosuccinimide (NBS) (3.75 g, 0.021 mol) was added to a solution of 3-decoxy-thiophene (2.53 g, 0.0105 mol) in CCl$_4$ (30 mL) as one portion. The resulting dark solution was stirred at room temperature for 16 hours under argon and protected from light. Then it was distilled to remove solvent, allowed to cool to room temperature and diluted with hexane (100 mL). The mixture was filtered. The filtrate was concentrated in vacuo and the yellow oily residue was chromatographed on a silica column using hexane as the eluent to give 3.38 g of light yellow liquid (83% yield). Mw=398.20. Element Anal. Calcd. for $C_{14}H_{22}Br_2OS$: C, 42.23; H, 5.57; Br, 40.13; 0, 4.02; S, 8.05. Found: C, 42.20; H, 5.60; Br, 40.0; O, 4.00; S, 8.10.

$^1$H-NMR: δ=6.77 (s, 1H), 3.99 (t, 2H, —OCH$_2$), 1.75 (2H, β-H) 1.45~1.27 (m, 14H, 7CH$_2$), 0.9 (t, 3H, —CH$_3$)

$^{13}$C-NMR: δ=154.57, 121.12, 110.53, 90.90, 71.30, 31.92, 29.58, 29.56, 29.50, 29.36, 29.33, 25.87, 22.72, 14.12

4,7-Bis-(3-decyloxy-thiophen-2-yl)-2,1,3-benzothiadiazole (6) (DTB)

A solution of 2-bromo-3-decyloxythiophene (2.5 g, 7.8 mmol) in 10 mL THF was added slowly over 5 minutes to a stirred suspension of magnesium (0.28 g, 12 mmol) in 5 ml THF at argon atmosphere. The mixture was stirred at 50° C. 3 hours and cooled down. The clear solution was added into a mixture of 4,7-dibromo-2,1,3-benzolthiadiazole (0.69 g, 2.37 mmol) and Ni(dppp)$_2$Cl$_2$ (42 mg, 0.078 mmol) in 20 ml THF under an inert atmosphere (Ar) and was refluxed for 18 hours. After the reaction completed, the mixture was poured into water and extracted by ether. The organic layer was washed by Na$_2$CO$_3$ and NaCl aqueous solutions, respectively, and dried with MgSO$_4$. After removal of the solvent (ether), the residue was applied onto a silica gel column and eluted with 2:8 CH$_2$Cl$_2$/hexane 0.796 g of red solid (55%). Mw=612.95. Element Anal. Calcd for $C_{34}H_{48}N_2O_2S_3$: C, 66.62; H, 7.89; N, 4.57; O, 5.22; S, 15.69. Found: C, 66.58; H, 7.70; N, 4.60; O, 5.12; S, 15.70.

$^1$H-NMR: δ=8.457 (S, 2H, benzo), 7.44 (d, 2H, 5-TH), 6.99 (d, 2H, 4-TH), 4.15 (t, 4H, —OCH$_2$), 1.82 (4H, 1-H), 1.45~1.27 (m, 28H, 14CH$_2$), 0.9 (t, 6H, —CH$_3$)

$^{13}$C-NMR: δ=153.64, 151.21, 126.73, 123.45, 125.30, 120.78, 115.27, 72.12, 31.92, 29.63, 29.59, 29.51, 29.35, 29.31, 26.06, 22.72, 14.13

4,7-Bis-(5-bromo-3-decyloxy-thiophen-2-yl)-2,1,3-benzothiadiazole (7)

N-Bromosuccinimide (NBS) (0.528 g, 2.86 mmol) was added to a solution of 4,7-Bis-(3-decyloxy-thiophen-2-yl)-benzo[1,2,5]thiadiazole (0.795 g, 1.3 mmol) in THF (20 mL). The resulting dark red solution was stirred at room temperature for 16 hours under argon atmosphere and protected from light. Then it was distilled to remove solvent, allowed to cool to room temperature, and diluted with hexane (100 mL). The mixture was filtered and the filtrate was concentrated in vacuo. After removal of the solvent (hexane), the residue was applied onto a silica gel column and eluted with 2:8 CH$_2$Cl$_2$/hexane to give 0.456 g dark red solid (83% yield). Mw=770.74. Element Anal. Calcd. for $C_{34}H_{46}Br_2N_2O_2S_3$: C, 52.98; H, 6.02; Br, 20.73; N, 3.63; 0, 4.15; S, 12.48. Found: C, 53.00; H, 6.01; Br, 20.67; N, 3.60; 0, 4.18; S, 12.50.

$^1$H-NMR: δ=8.34 (s, 2H), 6.98 (s, 2H), 4.13 (s, 4H, 2OCH$_2$), 1.84 (4H, β-H), 1.48~1.29 (28H, 7CH$_2$), 0.9 (t, 6H, 2CH$_3$)

$^{13}$C-NMR: δ=154.64, 152.21, 126.73, 123.45, 119.78, 117.74, 114.27, 72.10, 31.91, 29.61, 29.58, 29.50, 29.35, 29.31, 26.06, 22.70, 14.12

Poly(3-decyloxythiophene-2,5-diyl)s (P3DOT)

2,5-dibromo-3-decoxy-thiophene (1.23 g, 3.12 mmol) (1) was dissolved in 18 mL of dry THF. Methylmagnesium bromide (2.25 mL, 1.4M solution in toluene/THF) was added and the mixture was heated to reflux for 1 hour. Afterwards Ni(dppp)Cl$_2$ (16.9 mg) was added and the solution was stirred at reflux for 2 h. The mixture was poured into 150 mL of methanol and filtered. The solid was re-dissolved in chlorobenzene, filtered, and then precipitated with a mixture of acetone and methanol. The solid was collected by filtration and drying in vacuo to afford 0.510 g (65% yield) of the title polymer as a dark blue powder.

Poly(3-octylthiophene-2,5-diyl-co-3-decyloxythiophene-2,5-diyl)s (POT-co-DOT)

2,5-dibromo-3-decoxythiophene (0.760 g, 2 mmol) and 2,5 dibromo-3-octylthiophene (0.708 g, 2 mmol) was dissolved in 25 mL of dry THF. Methylmagnesium bromide (2.85 mL, 1.4 M solution in toluene/THF) was added and the mixture was heated to reflux for 1 h. Ni(dppp)Cl$_2$ (19 mg) was added and the solution was stirred at reflux for 6 h. The mixture was poured into 150 mL of methanol and filtered. The solid was re-dissolved in chlorobenzene and filtered then deposited with acetone/methanol. The solid was collected by filtration and drying in vacuo to afford 0.710 g (65% yield) of the title polymer as a dark blue powder.

Poly{(9,9-dioctylfluorene)-2,7-diyl-alt-[4,7-bis(3-decyloxythien-2-yl)-2,1,3-benzothiadiazole]-5',5"-diyl} (PF-co-DTB)

The mixture of 9,9-Dioctylfluorene-2,7-bis(trimethyl-eneborate) (204 mg, 0.36 mmol), 4,7-Bis-(5-bromo-3-decyloxy-thiophen-2-yl)-benzo[2,1,3]thiadiazole (280 mg, 0.36 mmol), toluene (15 mL), phase transfer agent, Aliquat 336® (52 mg), tetrakis(triphenylphosphine)palladium(0) (4.2 mg,), and 2M aqueous sodium carbonate solution (4.5 mL) were degassed and stirred at 110° C. for 12 hours. After cooling, the mixture was diluted with toluene and transferred to a separatory funnel. The aqueous phase was removed and the organic phase was washed with water. The mixture was precipitated from methanol. The solid was collected by filtration and dried in vacuo to yield 0.35 g (98% yield) of the title polymer as a dark red powder.

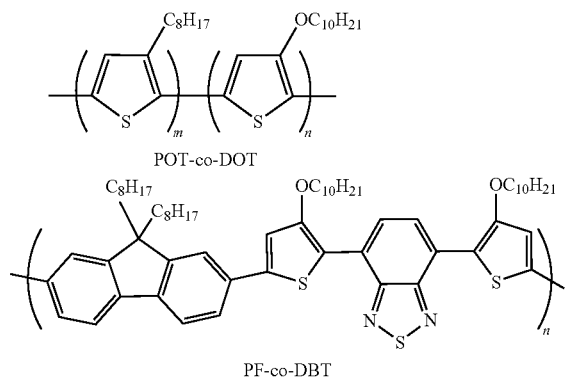

1.3. Photovoltaic Device Fabrication and Characterization

The polymer photovoltaic devices consisted of a thin film of a polymer blend (P3DOT, POT-co-DOT, PF-co-DTB with PCBM), sandwiched in-between a transparent anode (indium tin-oxide, ITO) and a metal cathode. Before device fabrication, the glass substrates coated with ITO (~150 nm) were cleaned sequentially by ultrasonic treatment in detergent, de-ionized water, acetone, isopropyl alcohol and UV-Ozone treatment for 20 minutes. Poly(3,4-ethylenedioxythiophene)/poly(styrenesulfonate) (PEDOT:PSS) layer of about 25 nm thick was spin-coated from an aqueous solution (Baytron P VP A1 4083) onto ITO coated glass substrates, followed by baking at 120° C. for 1 hour. The polymer/PCBM solution in chlorobenzene (CB) was prepared at various Polymer/PCBM weight ratios (Table 3). The mixture solution was then stirred for ~12 hours at 40° C. in a glove box and was spin-coated on top of the PEDOT:PSS layer. The thickness of the polymer/PCBM blend layers were in the range of 80 to 100 nm. To complete the device fabrication, ~1 nm thickness of lithium fluoride (LiF) and 80 nm thickness of aluminum (cathode) were successively deposited thermally under vacuum of ~10$^{-6}$ Torr. The active area of the device was approximately 0.11 cm$^2$. The current-voltage (I-V) curves were obtained by a Keithley 2400 source-measure unit. The photocurrent was measured under simulated AM1.5 G irradiation (100 mW/cm$^2$) using a xenon lamp based solar simulator (Oriel 96000 150 W Solar Simulator). The thicknesses of the various films were measured using Dektak profilometer. All devices were fabricated and tested in oxygen and moisture free nitrogen ambient inside a glove-box (<0.1 ppm O$_2$ & H$_2$O).

2. RESULTS AND DISCUSSION 2.1. Polymer Synthesis and Characterization

The random copolymer, poly(3-octylthiophene-2,5-diyl-co-3-decyloxythiophene, 2,5-diyl)s (POT-co-DOT) was synthesized via condensation polymerization using Grignard Metathesis (GRIM) method (Scheme 1). Equimolar amounts of 2,5-dibromo-3-decyloxythiophene (1) and 2,5-dibromo-3-octylthiophene (3) were employed. The results of polymerization are summarized in Table 1. The obtained copolymer, POT-co-DOT, has a dark blue color similar to the regioregular P3DOT prepared by the GRIM method. Even at high concentrations, POT-co-DOT is readily soluble in common organic solvents such as chlorobenzene, THF and chloroform. P3DOT is also soluble in chlorobenzene and dichlorobenzene, although at ambient temperature, the solubility of P3DOT is limited to less than 0.5%. We were able to prepare solutions of higher concentrations at elevated temperatures; however, thin films spin-coated from such solutions contained numerous particles and defects.

Gel permeation chromatography (GPC) showed that POT-co-DOT has a single and narrow molecular weight distribution. This is consistent with POT-co-DOT being a copolymer rather than a blend of two homopolymers. Using THF as the eluent and polystyrene as the standards, the GPC data demonstrates that the number-average (Mn) and weight-average (Mw) molecular weights of POT-co-DOT are 1.45×10$^4$, and 2.55×10$^4$ respectively. The polydispersity index (Mw/Mn) is 1.75 (Table 1). These molecular weight values are slightly higher than those of P3DOT, whose Mn and Mw are 1.07×10$^4$ and 1.59×10$^4$, respectively, with polydispersity=1.48. The $^1$H-NMR spectrum of P3DOT displayed in FIG. 1A reveals one aromatic-H peak at chemical shift δ 6.91 ppm, and one singlet peak at δ 4.16 ppm for the —OCH$_2$— group. This is consistent with the extensive analysis on regioregular P3AOTs and P3ATs by McCullough et al.,[30,31] and it confirms a highly regioregular H-T linkage in P3DOT. The $^1$H-NMR of POT-co-DOT shown in FIG. 1B has one sharp singlet peak at δ 4.16 ppm, similar to that of the regioregular P3DOT homopolymer shown in FIG. 1A, and another singlet peak at δ 2.79 ppm corresponding to the α-methylene protons of regioregular H-T linked poly(3-octylthiophene). These $^1$H-NMR results are evidences of highly regioregular H-T linkages of the thiophene units in POT-co-DOT.

Based on the relative areas of the peaks at δ 4.16 ppm and δ 2.79 ppm, the molar ratio of 3-decyloxythiophene to 3-octylthiophene units in POT-co-DOT was estimated to be 2.5:1. This ratio is much higher than the co-monomer feed ratio, 1:1, for copolymerization. This discrepancy indicates that during the GRIM copolymerization, the intermediate Grignard compound (2) in Scheme 2, which contains the alkoxy side chain, is more reactive and adds onto the propagating polymer chain more readily than the intermediate Grignard compound (4) containing an alkyl side chain. The resulting copolymer is mainly made up of 3-alkoxythiophene units.

Scheme 2 illustrates the synthetic routes to 4,7-Bis-(3-decyloxy-thiophen-2-yl)-2,1,3-benzothiadiazole (DTB) (6) and poly{(9,9-dioctylfluorene)-2,7-diyl-alt-[4,7-bis(3-decyloxythien-2-yl)-2,1,3-benzothiadiazole]-5',5''-diyl} (PF-co-DTB). DTB was synthesized via Kumada coupling method from (5) and 4,7-dibromo-2,1,3-benzothiadiazole. 4,7-Bis-(5-bromo-3-decyloxy-thiophen-2-yl)-2,1,3-benzothiadiazole (monomer 7) was synthesized from (6) and NBS in THF. PF-co-DTB was synthesized via Suzuki cross-coupling polymerization using equimolar amount of 9,9-dioctylfluorene-2,7-bis(trimethyleneborate) (DOF) and (7) in the presence of a Pd(PPh$_3$)$_4$ catalyst, K$_2$CO$_3$, and Aliquat336. At the end of the polymerization, bromobenzene and phenylboronic acid were added successively to convert the boronic acid and bromine located at the ends of the polymer chain to the more inert phenyl groups. The resulting PF-co-DTB is a dark red solid and has better solubility in organic solvents such as toluene, chloroform, THF, etc., than P3DOT and POT-co-DOT.

The chemical structure of PF-co-DTB was confirmed by $^1$H-NMR spectroscopy. The —OCH$_2$— protons from the DTB units appear at chemical shift δ 4.16 ppm, whereas the α-methylene protons of the DOF units are at δ 2.07 ppm. The molar ratio of fluorene to DTB in the copolymer, which can be calculated from the integrated areas of the peaks at 4.16 ppm and 2.07 ppm, is 1:1. This value is the same as the comonomer feed ratio in copolymerization. It is also consistent with an alternative copolymer structure. The GPC shows relatively high molecular weights, with Mn=6.8×10$^4$, Mw=1.15×10$^5$ (using polystyrene standards) and a polydispersity of 1.75 (Table 1). It is noted that the Mn of analogous poly[2,7-(9'(2'-ethylhexyl)-9-hexylfluorene)-alt-5,5'-(4',7'-di(thien-2-yl)-2', 1',3'-benzothiadiazole] (COPF-1) without any substituents on the thiophene units, reported by Svensson et al.,[33] is about 4800. This low molecular weight was attributed to the poor solubility of COPF-1. Compared to COPF-1, PF-co-DTB has substantially higher molecular weights and better solubility.

2.2. UV-Visible Absorption

Figure 3A:
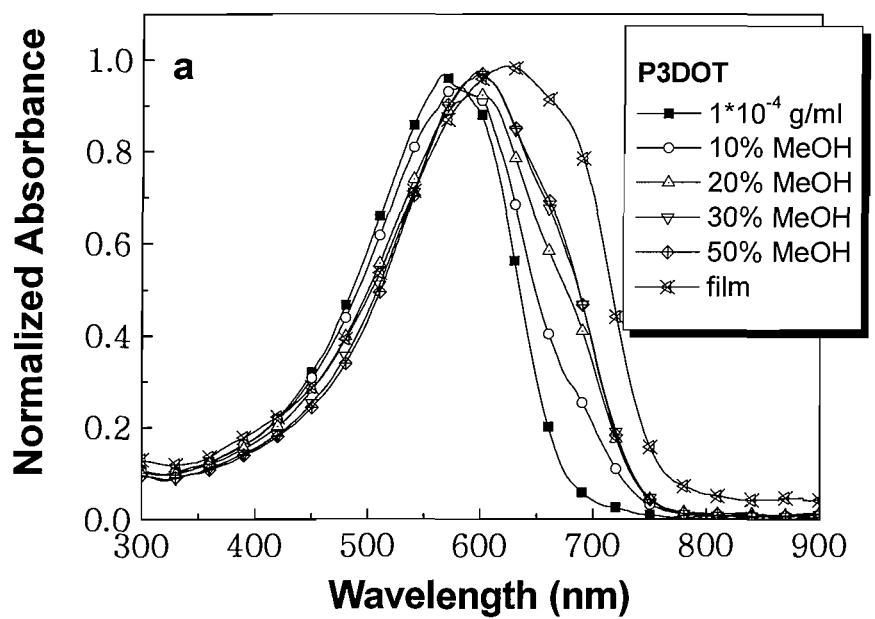
FIG. 3A is the UV-vis absorption spectra of P3DOT in solution ($1\times10^{-4}$ g/mL chloroform as solvent), in solid state (thin film spin-coated from chlorobenzene solution), and in chloroform solution containing various volume concentrations of methanol.
Figure 3B:
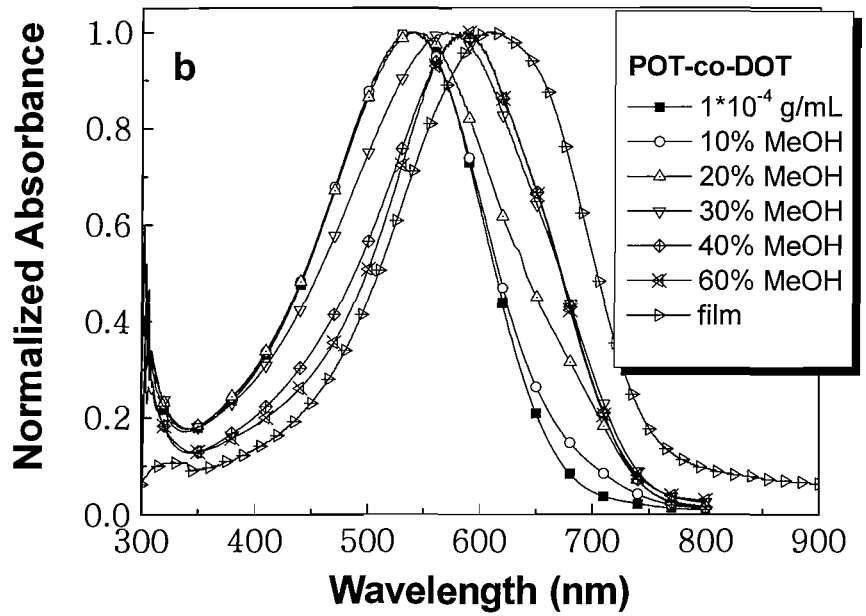
FIG. 3B is the UV-vis absorption spectra of POT-co-DOT in solution ($1\times10^{-4}$ g/mL chloroform as solvent), in solid state (thin film spin-coated from chlorobenzene solution), and in chloroform solution containing various volume concentrations of methanol.
Figure 3C:
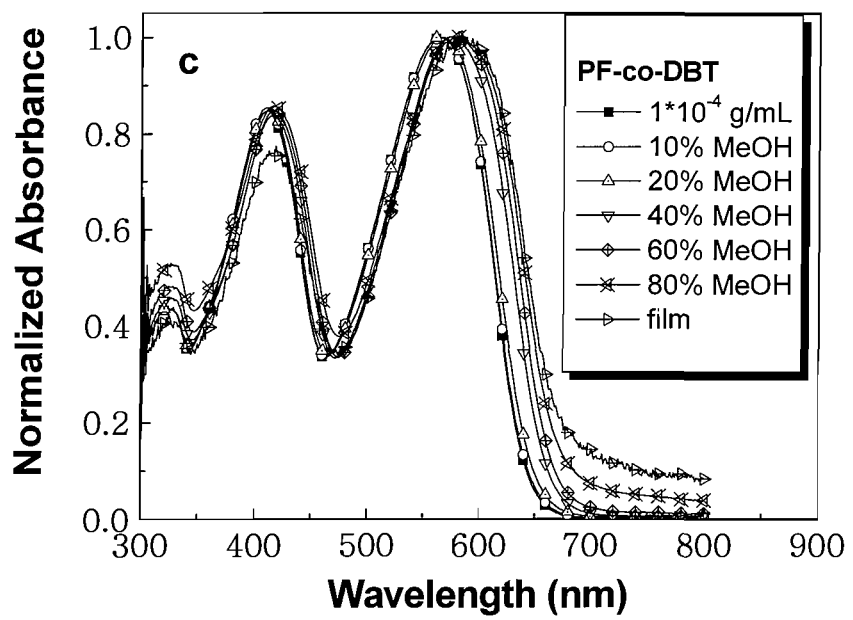
FIG. 3C is the UV-vis absorption spectra of PF-co-DTB in solution ($1\times10^{-4}$ g/mL chloroform as solvent), in solid state (thin film spin-coated from chlorobenzene solution), and in chloroform solution containing various volume concentrations of methanol.

Optical absorption spectra of the polymers were measured in dilute chloroform solution (1×10$^{-4}$ g/mL) as well as in solid thin films. The spectra are depicted FIGS. 3A, 3B, and 3C. The spectroscopic data of the polymers are summarized in Table 2. In dilute chloroform solution, POT-co-DOT has a π-π* absorption band at λ$_{max}$=538, approximately 30 nm blue-shifted than that of P3DOT, possibly due to of the presence of 3-alkyl side groups in the copolymer which are less effective in lowering the bandgap of the polymer than the electron-donating alkoxy side chain. Compared to the 98% regioregular poly(3-hexylthiophene) (P3HT) purchased from Aldrich, the π-π* absorption of copolymer POT-co-DOT is red-shifted by about 140 nm. In solution, PF-co-DTB has two distinct absorption peaks: one near 416 nm and another in 560 nm. The former peak is assigned to π-π* transition associated with the fluorene units. This peak is red-shifted by about ~30 nm compared to other fluorene copolymers. The red shift may be due to the strong electron-donating alkoxy side chains on thiophene rings that change the ionization potential of fluorene through the push-pull effect. The absorption peak at 560 nm may be assigned to the absorption of the DTB unit (FIG. 3C). We also evaluated the solvatochromic properties of the polymers. It is apparent that the absorption peak at 538 nm for POT-co-DOT in chloroform gradually shifts to 598 nm with the concentration of methanol (poor solvent) increased to the methanol/chloroform=3/2 volume ratio. The peak also broadens (FIG. 3B). This solvatochromism indicates that POT-co-DOT chains may have higher coplanarity and stronger intermolecular interaction in solid state than in solution. This phenomenon is also observed in P3DOT (FIG. 3A) and PF-co-DTB (with much smaller red shift as shown in FIG. 3C).

Figure 3D:
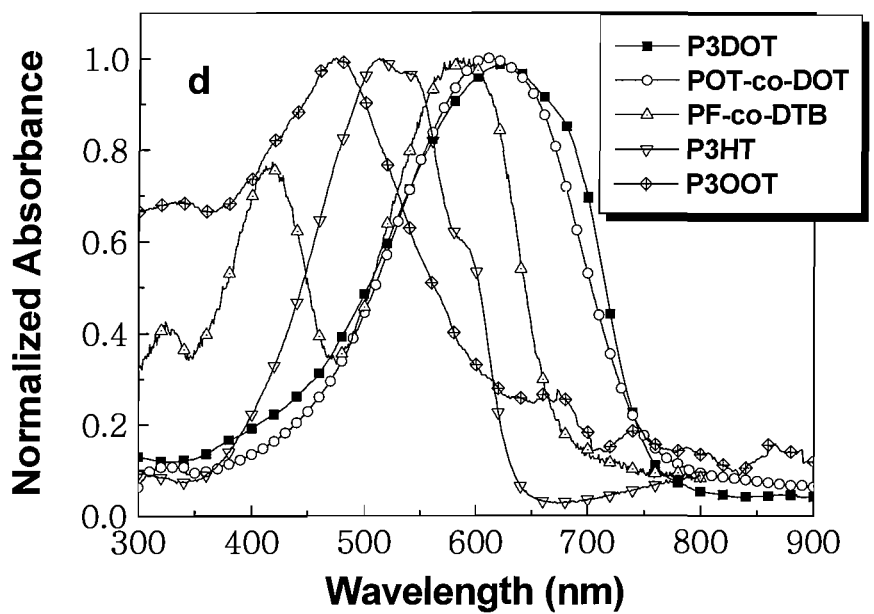
FIG. 3D is the UV-vis absorption spectra of solid films of P3DOT, POT-co-DOT, PF-co-DTB, P3HT (purchased from Aldrich), and P3OOT (prepared by oxidative polymerization using FeCl$_3$ 24).

50-80 nm thick thin films of the copolymers were spin-coated from their solutions in chlorobenzene. For comparison convenience, the UV-vis absorption spectra of thin films of P3DOT, POT-co-DOT, PF-co-DTB, regiorandom Poly(3-octyloxythiphene) (P3OOT) prepared by oxidative polymerization using FeCl$_3$, and regioregular P3HT are all plotted in FIG. 3D. The spectrum of regioregular POT-co-DOT thin film has an absorption maximum at ~621 nm (FIG. 3D and Table 2). The bandgap, determined from the onset of the absorption spectrum, is 1.64 eV. This value is similar to that of P3DOT but lower than those of the regiorandom P3OOT and regioregular P3HT. Similarly large red shift of the absorption spectra from regiorandom to regioregular P3ATs has also been reported. The red-shift has been attributed to high percentage of head-to-tail linkages in the regioregular polymer that leads to longer conjugated length and more orderly packing of the polymer chains. Because POT-co-DOT has a regioregular structure and electron-donating decyloxy side chains, the absorption is substantially red-shifted compared to those of P3OOT and P3HT.

The general feature of the UV-vis absorption spectrum of PF-co-DTB in solid state is similar to that in solution. The lower energy absorption peak at λ$_{max}$=581 nm is red-shifted only by 20 nm from solution to thin film. This red shift indicates higher coplanarity of the polymer and/or enhanced intermolecular electronic interactions in the solid state; nonetheless, the increase in coplanarity and/or the enhancement of intermolecular electronic interactions are less significant than in P3DOT and POT-co-DOT. The onset of the optical absorption in the thin film is at about 700 nm (Eg=1.77 eV). This value is ~0.14 eV lower than that of P3HT, a popular material in polymer solar cells.

It is worthwhile to compare the bandgap of PF-co-DTB with those of COPF-1 and poly[2,7-(9,9-dioctylfluorene)-alt-2',2'-(4',7'-di(3-hexylthien-2-yl)-2',1',3'-benzothiadiazole)] (COPF-2). The bandgap of PF-co-DTB is ~0.2 eV smaller than those of COPF-1 and COPF-2. The UV-vis absorption peak of PF-co-DTB is approximately 40 nm and 60 nm red-shifted than those of COPF-1 and COPF-2, respectively (Table 2). The electron-donating decyloxy groups in PF-co-DTB raise the HOMO level and consequently reduce the bandgap of the copolymer. The smaller bandgap should help improve the absorption efficiency in the solar spectrum.

2.3. Electrochemical Characterization

The electrochemical characteristics of polymer thin films coated on Pt electrode were studied by cyclic voltammetry in a 0.1M Bu$_4$N.BF$_4$ solution in acetonitrile. The scan rate was 100 mV/s. The results are summarized in Table 2. The oxidation potentials, E$_{ox}$, were derived from the onset in the cyclic voltammograms. The cyclic voltammogram of POT-co-DOT reveals a broad and reversible oxidation (p-doping) wave. The E$_{ox}$ is 0.146 vs SCE, higher than the E$_{ox}$=0.075 V for P3DOT, due to the presence of the 3-octylthiophene units. Compared to the E$_{ox}$ values of the regiorandom P3OOT and regioregular P3HT shown in Table 2, the E$_{ox}$ of PO-co-DOT is at lower potentials. This is not unexpected since longer conjugation and/or alkoxy side groups make PO-co-DOT more oxidizable.

The highest occupied molecular orbital (HOMO) is calculated according to $$E_{HOMO} = -e(E_{ox} + 4.4\,V)$$

where $E_{ox}$ is the onset oxidation potential vs SCE. From this equation, the HOMO values of P3DOT and POT-co-DOT were calculated to be −4.47 eV and −4.55 eV, respectively.

Because no reversible n-doping process was observed on the cyclic voltammograms, the LUMO levels were estimated from the HOMO values and values of optical bandgaps by $$E_{LUMO}=E_{HOMO}+E_g$$

From this equation, the LUMO values of P3DOT and PO-co-DOT were calculated to be −2.87 eV and −2.91 eV, respectively.

The cyclic voltammogram of the copolymer PF-co-DTB exhibits two reversible p-doping processes. No reversible n-doping process was observed. The first p-doping process with an onset potential of 0.740 V may be assigned to the oxidation associated with the DTB units. The second oxidation process at 0.940 V may be associated with the oxidation of the fluorene segments. This potential is lower than the typical oxidation onset of polyfluorene homopolymer at 1.4 V.[36] The difference may be resulted from the possible charge transfer between neighboring fluorene and DTB units. Using the equations above, the HOMO and LUMO values of PF-co-DTB were calculated to be −5.14 eV and −3.36 eV, respectively.

2.4. Polymer Solar Cells

The polymer solar cells had a layered structure of glass/ITO/PEDOT-PSS/polymer-PCBM blend/LiF/Al. The active layer is the polymer-PCBM blend at various polymer/PCBM weight ratios. It was spin-coated from a solution containing the polymer and PCBM in chlorobenzene onto an ITO/glass substrate covered by poly(3,4-ethylenedioxythiophene)/poly(styrenesulfonate) (PEDOT-PSS). Thin layers of LiF (1 nm) and aluminum (80 nm) were thermally deposited under vacuum. Representative characteristics of the solar cell are listed in Table 3. All data were obtained under white light illumination (Air Mass 1.5 G, 100 mW/cm$^2$) from a solar simulator which had been calibrated by silicon diode with Hamamatsu KG-5 filter. The spectral mismatch of our measuring system has been taken into the calculations.

Figure 4A:
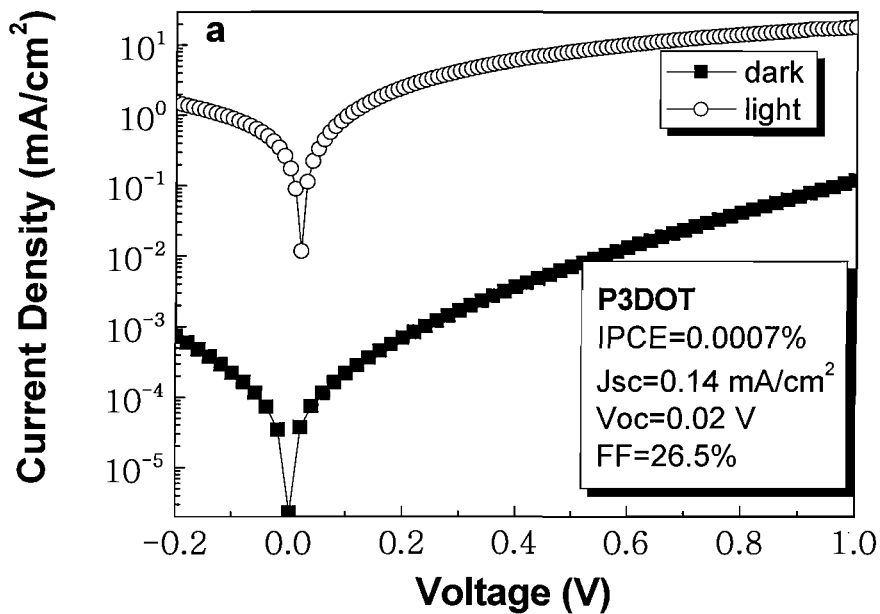
FIG. 4A shows the current-voltage characteristics of P3DOT/PCBM (1:1) bulk heterojunction solar cells in the dark and under white light illumination (AM 1.5 conditions).
Figure 4B:
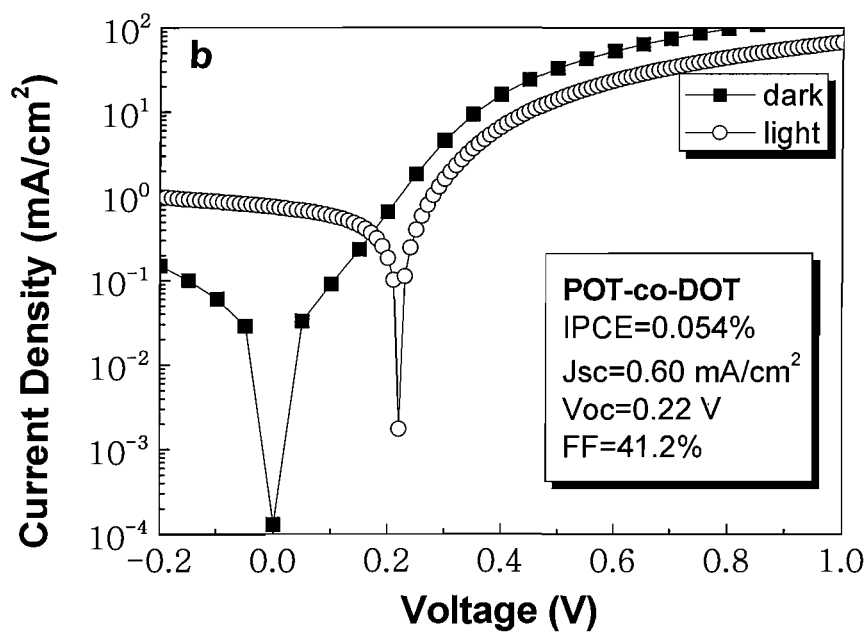
FIG. 4B shows the current-voltage characteristics of POT-co-DOT/PCBM (1:1) bulk heterojunction solar cells in the dark and under white light illumination (AM 1.5 conditions).
Figure 4C:
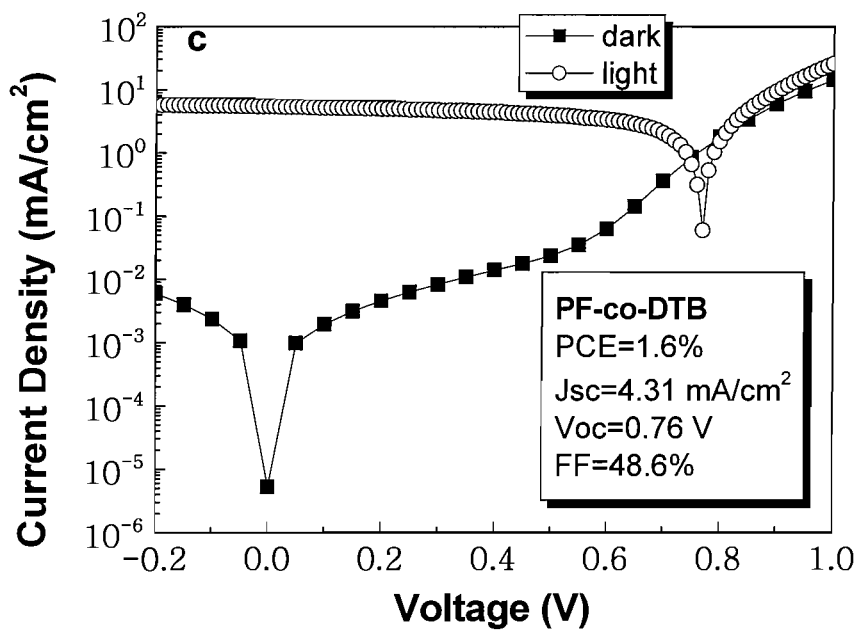
FIG. 4C shows the current-voltage characteristics of PF-co-DTB/PCBM (1:4) bulk heterojunction solar cells in the dark and under white light illumination (AM 1.5 conditions).

The current-voltage characteristics of the solar cells based on the three blends P3DOT/PCBM, POT-co-DOT/PCBM and PF-co-DTB/PCBM are shown in FIGS. 4A, 4B, and 4C. Under white light illumination (100 mW/cm$^2$), the cell based on P3DOT/PCBM as the active layer has a short circuit current density (Jsc) of 0.14 mA/cm$^2$, an open circuit voltage (Voc) of 0.020 V, and a fill factor (FF) of 26.5%. The low rectification ratio (~1) may be resulted from one of these two factors: one is that the polymer blend layer was not uniform due to pure form-forming ability of P3DOT; the other is that P3DOT may be oxidized upon exposure to air (Eox=0.075 vs SCE), thus reducing shunt resistance. These negative factors with P3DOT are alleviated in POT-co-DOT/PCBM which are better film-forming and have higher oxidation potential. Under the same white light illumination, Jsc is 0.60 mA/cm$^2$, Voc is 0.22 V, and FF is 41.2%. The power conversion efficiency (PCE) is increased to 0.054%, a substantial improvement compared to the P3DOT-based cell which has a PCE of 0.0007%, but is still far from being satisfactory. The rectification ratio of the POT-co-DOT cell is still low, due to high dark current or low shunt resistance. The Voc of this device is also low. Generally, Voc is a measure of the difference between the oxidation potential of the donor (POT-co-DOT and P3DOT) and the reduction potential of the acceptor (PCBM). Thus, raising HOMO, as in POT-co-DOT, closer to the LUMO of PCBM diminishes the value of Voc.

Figure 4D:
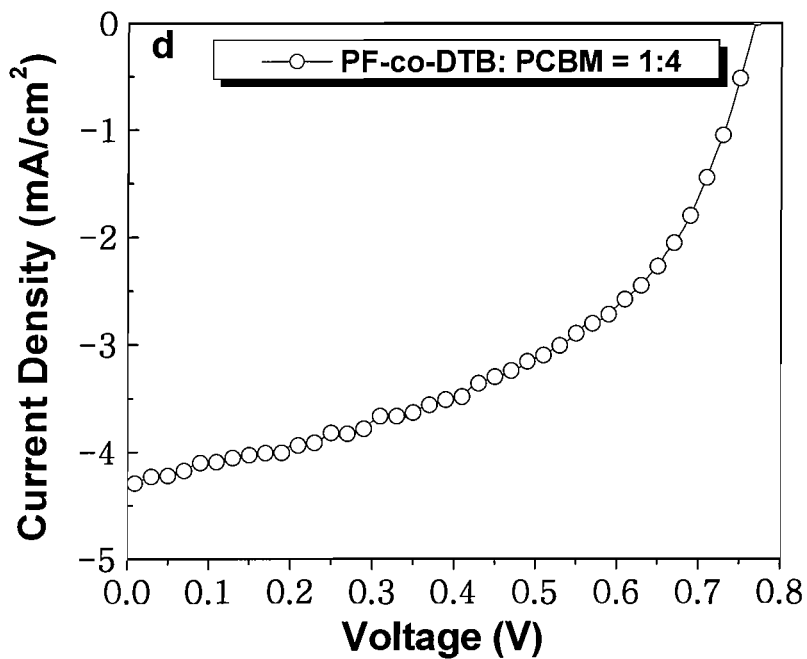
FIG. 4D shows the cells from FIG. 4C, PF-co-DTB/PCBM=1:4, with photo current plotted in linear scale between 0 V and open-circuit voltage.
Figure 5A:
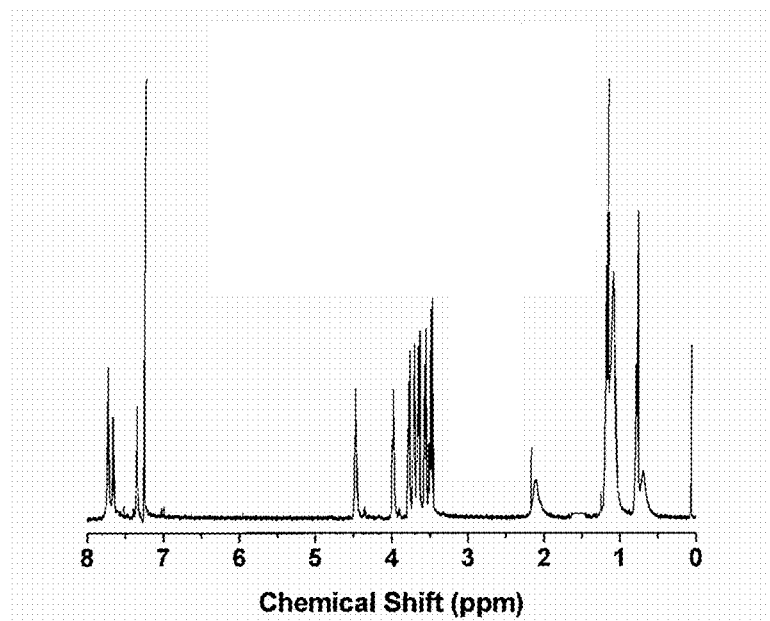
FIG. 5A is the $^1$H-NMR of Poly{(9,9-dioctylfluorene)-2,7-diyl-alt-[4,7-bis(3-(2-(2-(2-ethoxy-ethoxy)-ethoxy)-ethoxy-2-yl)-2,1,3-benzothiadiazole]-5',5"-diyl}.
Figure 5B:
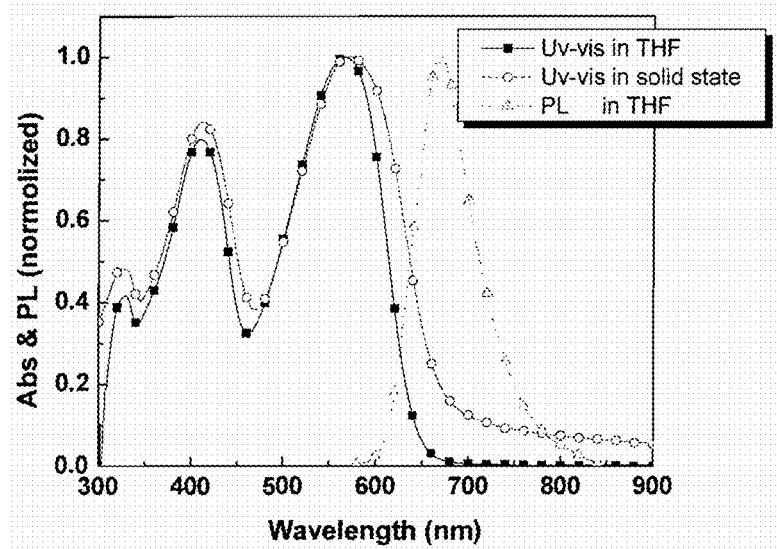
FIG. 5B is the UV-vis absorption and PL spectra of Poly{(9,9-dioctylfluorene)-2,7-diyl-alt-[4,7-bis(3-(2-(2-(2-ethoxy-ethoxy)-ethoxy)-ethoxy-2-yl)-2,1,3-benzothiadiazole]-5',5"-diyl} in THF and in solid state at room temperature.
Figure 6A:
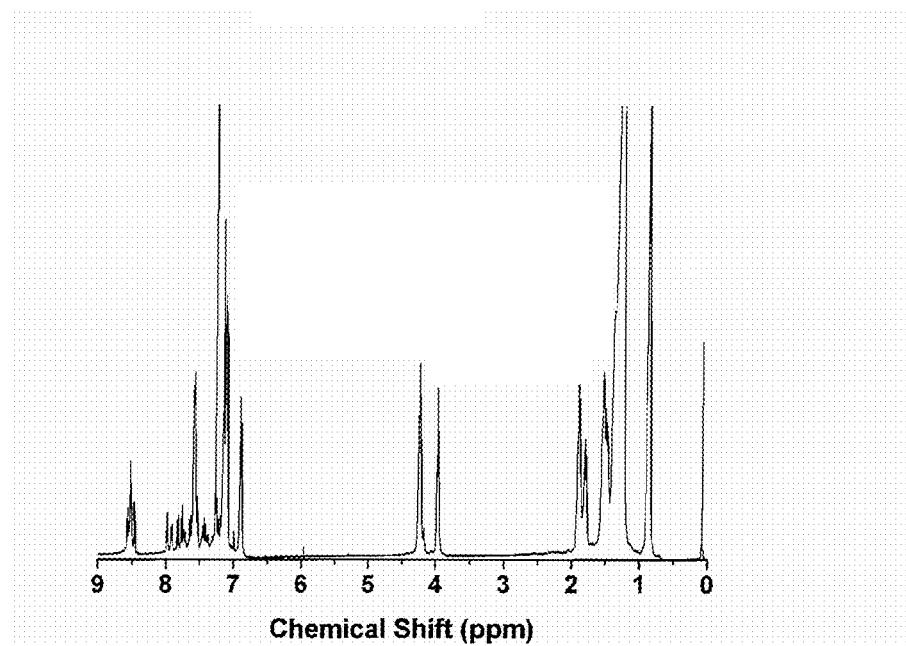
FIG. 6A is the $^1$H-NMR of PTA-co-DBT.
Figure 6B:
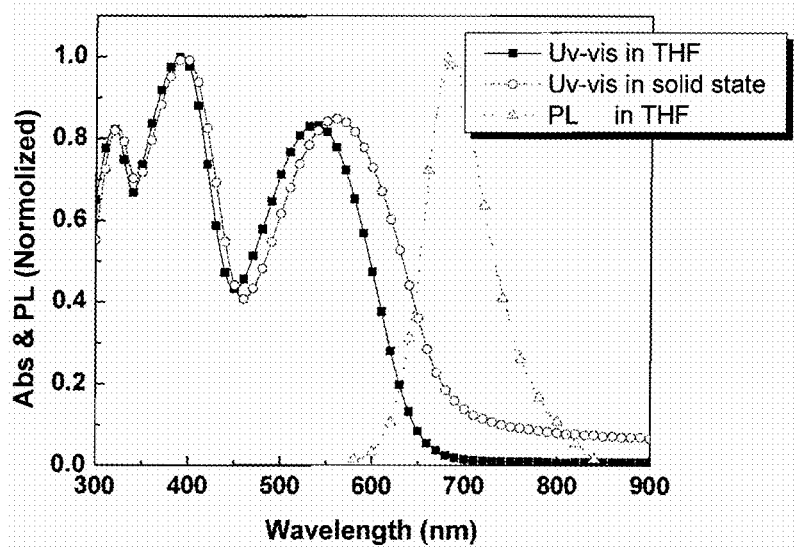
FIG. 6B is the UV-vis absorption and PL spectra of PTA-co-DBT in THF and in solid state at room temperature.
Figure 7:
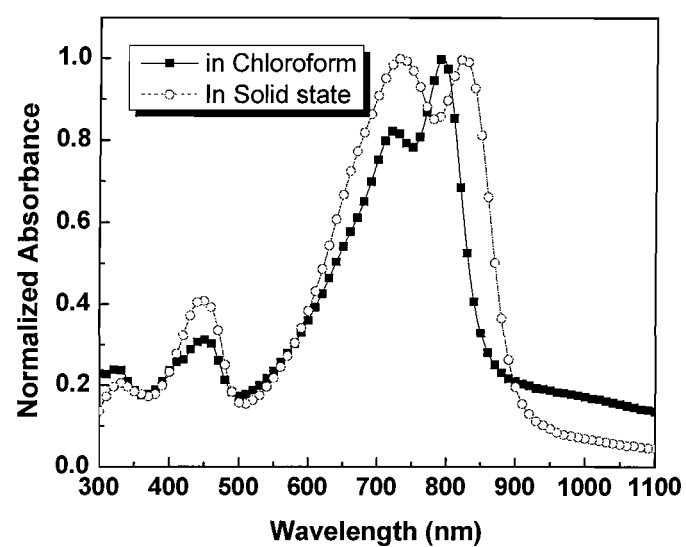
FIG. 7 is the UV-vis absorption of Poly(4,7-Bis-(3-dodecyloxy-thiophen-2-yl)-2,1,3-benzothiadiazole) in chloroform and in solid state at room temperature.

The solar cell made from copolymer PF-co-DTB exhibits higher PCE. PF-co-DTB has not only much better solubility and processability than P3DOT and POT-co-DOT but also has the lowest HOMO value (−5.14 eV). The low HOMO value accounts for a high value of Voc up to 0.76 V. The weight ratio of PF-co-DTB to PCBM has a significant influence on the performance of the cell, similar to the bulk heterojunction solar cells based on poly[2-methoxy-5-(3',7'-dimethyloctyloxy)-p-phenylenevinylene](MDMO-PPV): PCBM. The composition dependence of the polymer solar cells reflects the combined results of the exciton generation efficiency (absorption efficiency), the efficiency of e-h separation at the polymer/PCBM interfaces and the percentage of electrons and holes reaching the charge-collecting electrodes. Lower content of PCBM leads to inefficient dissociation of exciton and a decrease in photocurrent. With increasing PCBM content, both the Jsc and FF are increased (Table 3). It is noted that in the PF-co-DTB/PCBM blends, light is mainly absorbed by PF-co-DTB. Therefore the very high content of PCBM lowers the absorption efficiency. The best performance we have obtained thus far is from the blend with the weight ratio of PF-co-DTB to PCBM being 1:4. Under white light illumination (AM 1.5 G, 100 mW/cm$^2$), the obtained Jsc is 4.31 mA/cm$^2$, Voc is 0.76 V, FF is 48.6%, and PCE is 1.6% (FIGS. 4C, 4D). These results may be compared with the high-performance polymer solar cell based on poly[2,7-(9' (2'-ethylhexyl)-9-hexylfluorene)-alt-5,5'-(4',7'-di(thien-2-yl)-2',1',3'-benzothiadiazole] (COPF-1), [33] reported by a Swedish group. The spectrum of PF-co-DTB is red-shifted by about 30 nm. This helps increase the photovoltaic current as the solar photon flux is higher in this energy range. On the other hand, as the polymer's HOMO is increased to −5.14 eV from the −5.47 eV for COPF-1, the Voc is decreased. Overall, the PCE is on the same level. We are currently experimenting with other n-type materials having higher LUMO values than PCBM; the Voc and the PCE values may be raised. The results will be reported in future publications.

3. ADDITIONAL EXAMPLES

3.1. Poly{(9,9-dioctylfluorene)-2,7-diyl-alt-[4,7-bis (3-(2-(2-(2-ethoxy-ethoxy)-ethoxy)-ethoxy-2-yl)-2,1, 3-benzothiadiazole]-5',5"-diyl}

Synthesis: The mixture of 9,9-Dioctylfluorene-2,7-bis(trimethyleneborate) (208 mg, 0.372 mmol), 4,7-Bis-(5-bromo-3-{2-[2-(2-ethoxy-ethoxy)-ethoxy]-ethoxy}-thiophen-2-yl)-[2,1,3]-benzothiadiazole (302 mg, 0.372 mmol), toluene (15 mL), phase transfer agent, Aliquat 336® (52 mg), tetrakis(triphenylphosphine)palladium(0) (4.2 mg), and 2M aqueous sodium carbonate solution (4.5 mL) were degassed and stirred at 110° C. for 12 hours. After cooling, the mixture was diluted with toluene and transferred to a separatory funnel. The aqueous phase was removed and the organic phase was washed with water. The mixture was precipitated from methanol. The solid was collected by filtration and dried in vacuo to yield 0.27 g (61% yield) of the title polymer as a dark red powder.

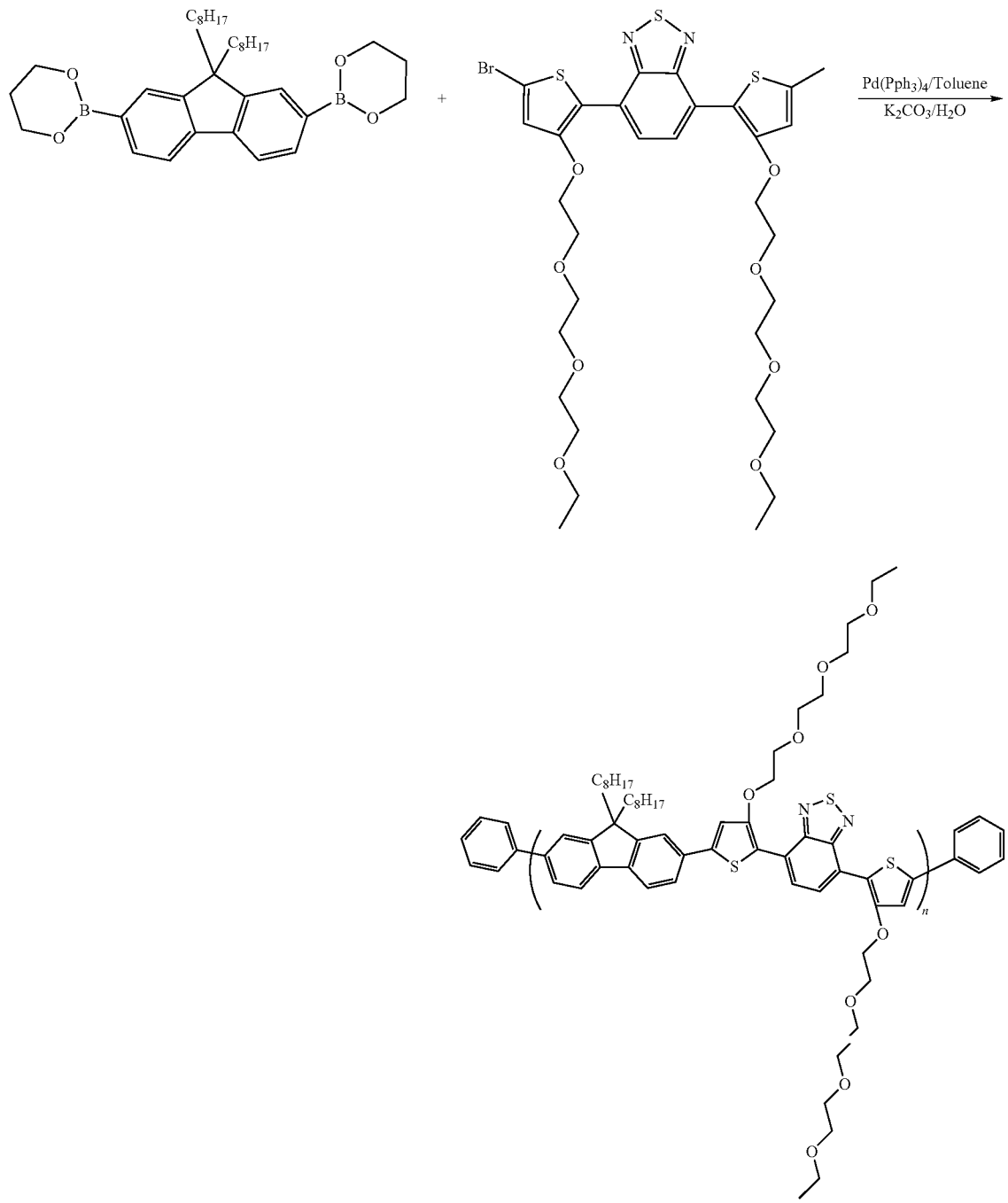

Chemical properties: Mw=49800, Mn=20300, MWD=2.45

Physical properties (spectra in FIGS. 5A-5B):

Absorption: λmax_solution=403, 553 nm; λmax_film=411, 571 nm; λmax_onset=700 nm; Band GapAB=1.77 eV Emission: λmax_solution=667 nm Electrochemistry: Eox=0.66 V, Ered=−0.974, Band Gap EC=1.63 eV HOMO=−5.02 eV, LUMOEC=−3.39 eV, LUMOAB=−3.25 eV Solar cell performance: see Table 4

3.2. PTPA-co-DTB

Synthesis: The mixture of (4-Dodecyloxy-phenyl)-bis-[4-(4,4,5,5-tetramethyl-[1,3,2]dioxaborolan-2-yl)-phenyl]-amine (195 mg, 0.286 mmol), 4,7-Bis-(5-bromo-3-decyloxy-thiophen-2-yl)-2,1,3-benzothiadiazole (220 mg, 0.286 mmol), toluene (15 mL), phase transfer agent, Aliquat 336® (52 mg), tetrakis(triphenylphosphine)palladium(0) (2 mg), and 2M aqueous sodium carbonate solution (4.5 mL) were degassed and stirred at 110° C. for 12 hours. After cooling, the mixture was diluted with toluene and transferred to a separatory funnel. The aqueous phase was removed and the organic phase was washed with water. The mixture was precipitated from methanol. The solid was collected by filtration and dried in vacuo to yield 0.30 g (78% yield) of the title polymer as a dark red powder.

then washed with distilled water, methanol, and acetone in this order. After drying under vacuum, dark green powder of Polymer was obtained (yield=0.20 g, 90%).

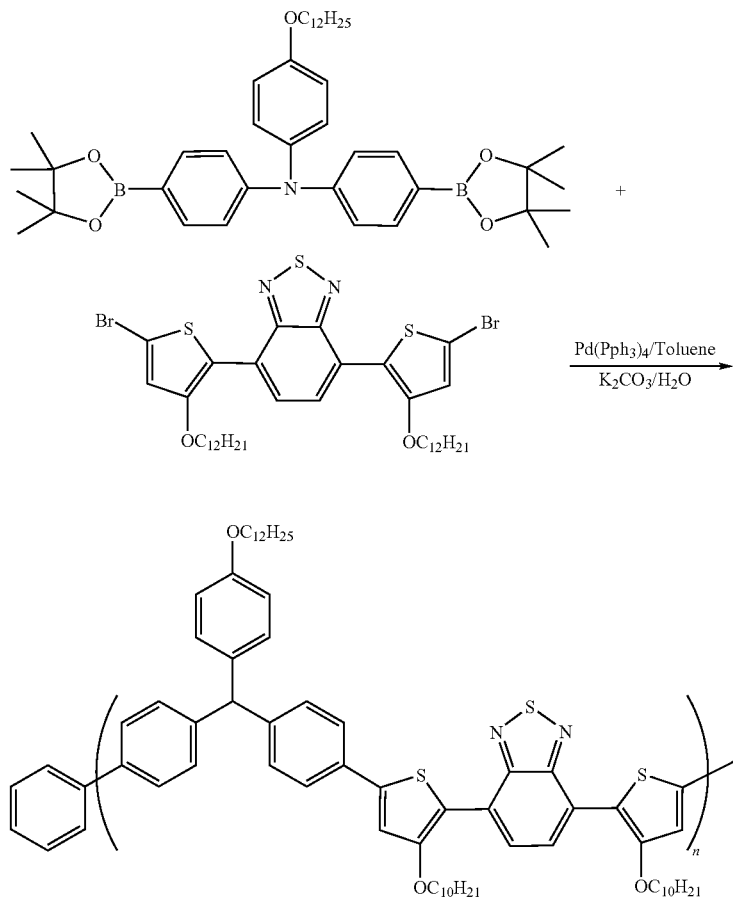

Chemical properties: Mw=13700, Mn=6050, MWD=2.26

Physical properties (spectra in FIGS. 6A-6B):

Absorption: λmax_solution=400, 535 nm; λmax_film=400, 555 nm; λmax_onset=700 nm; Band GapAB=1.77 eV Emission: λmax_solution=681 nm Electrochemistry: Eox=0.70 V, HOMO=−5.06 eV, LUMOAB=−3.29 eV.

Solar cell performance: see Table 5

3.3. Poly(4,7-Bis-(3-dodecyloxy-thiophen-2-yl)-2,1,3-benzothiadiazole)

Synthesis: To a mixture of 4,7-Bis-(5-bromo-3-dodecyloxy-thiophen-2-yl)-benzo[1,2,5]thiadiazole (0.3 g) and hexamethylditin (0.125 g) in dry THF (10 mL) and dry DMAc (5 mL) were added Pd(PPh$_3$)$_4$ (22 mg) and copper(I) iodide (4 mg) as the catalysts. After being stirred for 24 h at 80° C. under Ar, the reaction mixture was added into methanol (ca. 5%). The precipitated polymer was separated by filtration and

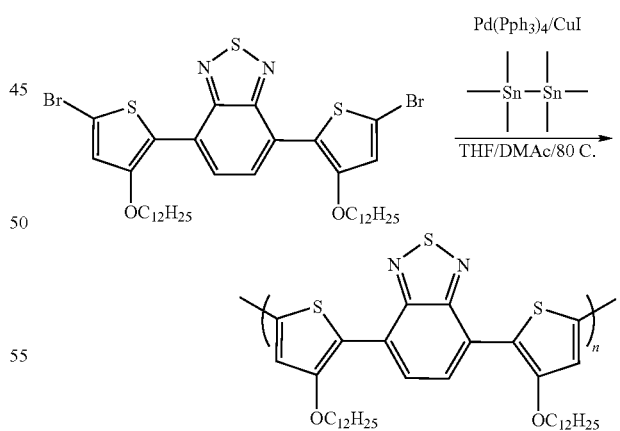

Physical properties (spectra in FIG. 7):

Absorption: λmax_solution=793, 713 nm; λmax_film=825, 735 nm; λmax_onset=932 nm; Band Gap$_{AB}$=1.34 eV Emission: Cannot be measured Electrochemistry: Eox=0.24 V, HOMO=−4.64 eV, LUMOAB=−3.30 eV

3.4. Regioregular Poly(3-alkoxythiophene) with Different Side Chains

Synthesis (using P3DOT as an example): 2,5-dibromo-3-decoxy-thiophene (1.23 g, 3.12 mmol) (1) was dissolved in 18 mL of dry THF. Methylmagnesium bromide (2.25 mL, 1.4M solution in toluene/THF) was added and the mixture was heated to reflux for 1 hour. Afterwards Ni(dppp)Cl$_2$ (16.9 mg) was added and the solution was stirred at reflux for 2 h. The mixture was poured into 150 mL of methanol and filtered. The solid was re-dissolved in chlorobenzene, filtered, and then precipitated with a mixture of acetone and methanol. The solid was collected by filtration and drying in vacuo to afford 0.510 g (65% yield) of the title polymer as a dark blue powder.

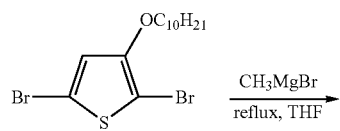

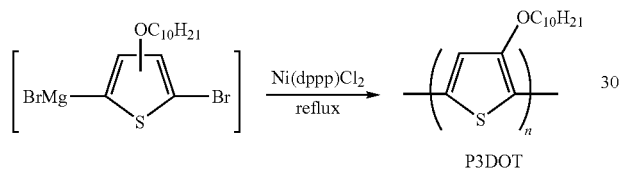

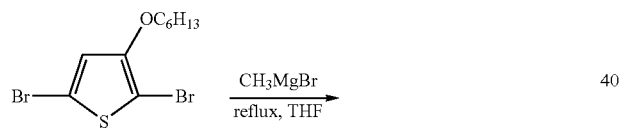

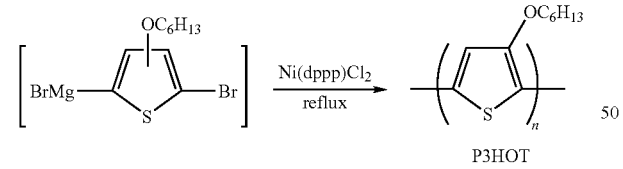

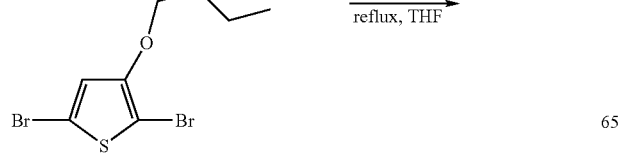

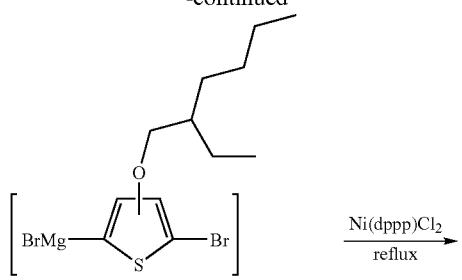

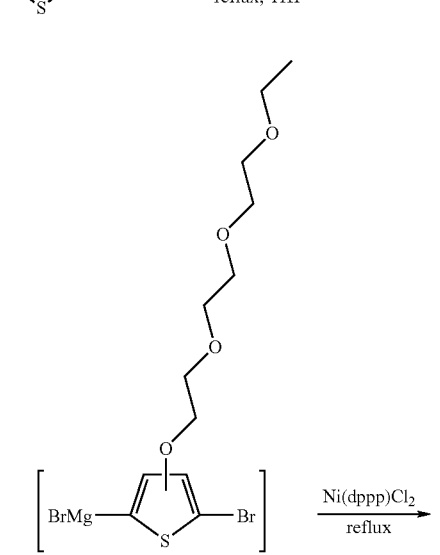

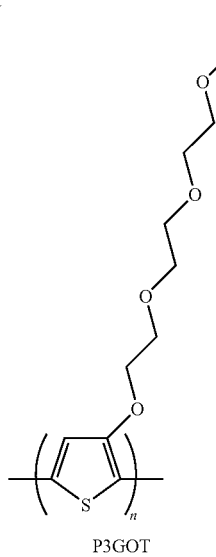

P3GOT

Chemical Properties:

These have similar chemical properties. The only difference is solubility, which increases, as the side chain length increases.

4. CONCLUSION

A series of conjugated polymers using alkoxythiophene as the building block was synthesized. The copolymer POT-co-DOT has high head-to-tail regioregularity, similar to the homopolymer P3DOT. The alternating copolymer PF-co-DTB is also regioregular, as the comonomers have symmetric structure. Optical and electrochemical characterizations reveal that all of these copolymers have low bandgaps and high regioregularity, making them promising materials for the photosensitizers, electron donor and hole transporter in polymer solar cells. The bulk hetero-junction solar cells fabricated using blends of these polymers with PCBM exhibit varied performance, depending on the polymers' film-forming ability and HOMO level. The best solar cell performance obtained has a layered structure of ITO/PEDOT-PSS/PF-co-DTB:PCBM(1:4)/LiF/Al. Under white light illumination (AM 1.5 G, 100 mW/cm$^2$), the obtained Jsc is 4.3 mA/cm$^2$, Voc is 0.76V, FF is 48.6%, and PCE is 1.6%. All these results were calibrated by the spectral mismatch. Further efforts include studies to further improve the solar cell architecture and PCE.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

Scheme 1: GRIM synthesis of regioregular poly(3-decyloxythiophene-2,5-diyl) (P3DOT) and random regioregular poly(3-octylthiophene-2,5-diyl-co-3-decyloxythiophene-2,5-diyl) (POT-co-DOT)

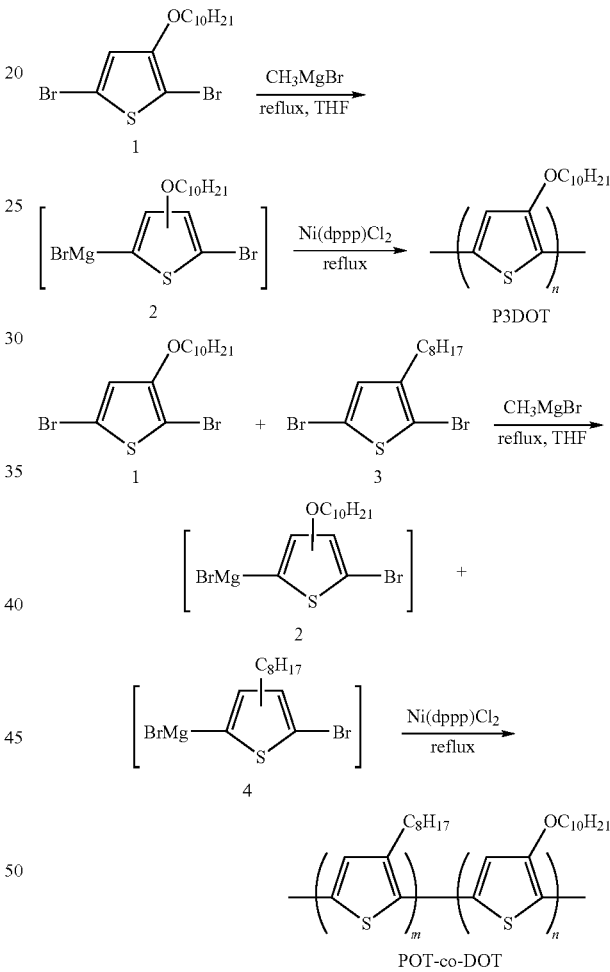

Scheme 2. Synthesis of 4,7-bis-(3-decyloxy-thiophen-2-yl)-2,1,3-benzothiadiazole (DTB) and its alternating copolymer with 9,9-dioctylfluorene (PF-co-DTB)

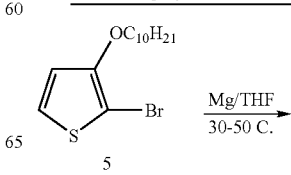

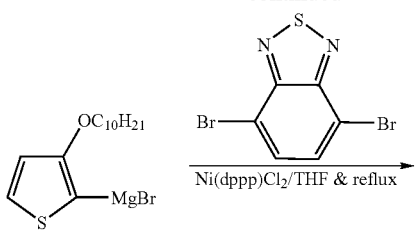

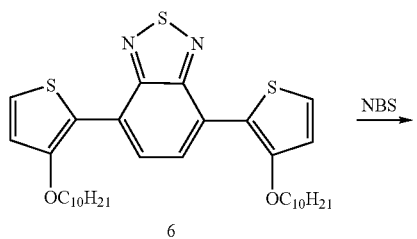

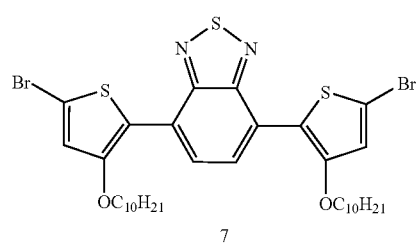

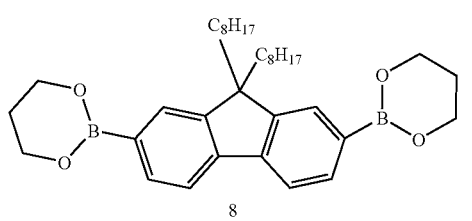

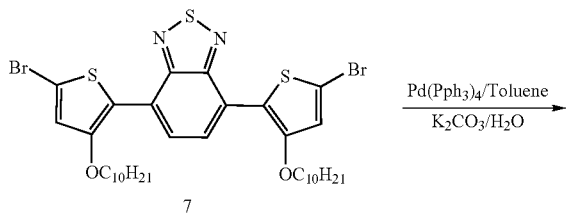

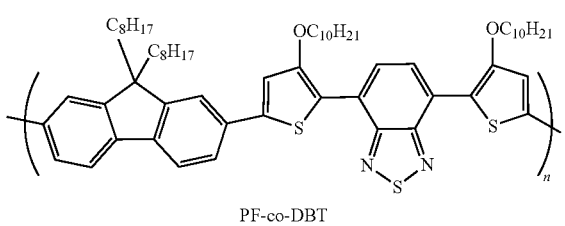

TABLE 1

Molecular weight and composition of the polymers

| | $Mn^a$ | $Mw/Mn^a$ | Co-monomer feed molar ratio $^b$ | Co-monomer molar ratio in copolymers $^{b,c}$ |
|---|---|---|---|---|
| P3DOT | $1.07 \times 10^4$ | 1.48 | — | |
| POT-co-DOT | $1.45 \times 10^4$ | 1.75 | 1:1 | 2.5:1 |
| PF-co-DTB | $6.80 \times 10^4$ | 1.69 | 1:1 | 1:1 |

$^a$ Calculated from GPC (eluent: THF; polystyrene standards).
$^b$ Comonomer ratios are 3-decyloxythiophene to 3-octylthiophene in POT-co-DOT, and DOF to DTB in PF-co-DTB;
$^c$ Calculated from $^1$H-NMR spectra based on the relative abundances of the —OCH$_2$— and —CH$_2$— groups adjoining the thiophene rings.

TABLE 2

UV-vis absorption and electrochemical properties of the polymers in solution and in solid state

| | $\lambda_{max}$(nm) | | Band-gap (eV) | Eox (V)$^e$ | HOMO (eV) | LUMO (eV) |
|---|---|---|---|---|---|---|
| | In CHCl$_3$ | Film | | | | |
| P3DOT | 565 | 624 | 1.60 | 0.075 | −4.47 | −2.87 |
| POT-co-DOT | 538 | 621 | 1.64 | 0.146 | −4.55 | −2.91 |
| PF-co-DTB | 412, 560 | 416, 581 | 1.78 | 0.740 | −5.14 | −3.36 |
| P3HT$^a$ | 425 | 514 | 1.92 | 0.348 | −4.75 | −2.83 |
| P3OOT$^b$ | 458 | 472 | 1.91 | 0.069 | −4.47 | −2.56 |
| COPF-1$^c$ | 380, 540 | 384, 545 | 2.02 | 1.07 | −5.47 | −3.46 |
| COPF-2$^d$ | 370, 520 | 370, 525 | 2.06 | 1.20 | −5.60 | −3.54 |

$^a$Purchased from Sigma-Aldrich
$^b$Prepared by FeCl$_3$ at 0° C. $^{24}$
$^c$From reference $^{33}$
$^d$From reference $^{34}$
$^e$Eox is the onset potential of oxidation.

TABLE 3

Characteristics of Bulk Heterojunction Polymer Solar Cells:

| | Polymer/PCBM (w/w ratio) | Jsc (mA/cm$^2$) | Voc (V) | FF (%) | PCE (%) |
|---|---|---|---|---|---|
| P3DOT | 1:1 | 0.14 | 0.02 | 26.5 | 0.0007 |
| POT-co-DOT | 1:1 | 0.60 | 0.22 | 41.2 | 0.054 |
| PF-co-DTB | 2:1 | 0.74 | 0.83 | 25.5 | 0.16 |
| PF-co-DTB | 1:1 | 2.92 | 0.78 | 32.8 | 0.74 |
| PF-co-DTB | 1:2 | 4.00 | 0.76 | 44.6 | 1.27 |
| PF-co-DTB | 1:4 | 4.31 | 0.76 | 48.6 | 1.60 |

Short-Circuit Current Density (Jsc), Open-Circuit Voltage (Voc), Fill Factor (FF), Power Conversion Efficiency (PCE) at Various Polymer/PCBM Weight Ratios (AM 1.5 G irradiation at 100 mW/cm$^2$).

TABLE 4

Solar cell performance for Poly{(9,9-dioctylfluorene)-2,7-diyl-alt-[4,7-bis(3-(2-(2-ethoxy-ethoxy)-ethoxy)-ethoxy-2-yl)-2,1,3-benzothiadiazole]-5',5''-diyl}

| Polymer/PCBM (w/w ratio) | Jsc(mA/cm$^2$) | Voc(V) | FF (%) | PCE (%) |
|---|---|---|---|---|
| 1:1 | 2.02 | 0.53 | 39.2 | 0.42 |
| 1:2 | 3.09 | 0.63 | 41.6 | 0.81 |
| 1:4 | 3.38 | 0.69 | 45.9 | 1.07 |
| 1:5 | 3.32 | 0.61 | 41.9 | 0.85 |
| 1:6 | 3.15 | 0.63 | 37.3 | 0.74 |

TABLE 5

Solar cell performance for PTPA-co-DTB

| Polymer/PCBM (w/w ratio) | Jsc(mA/cm$^2$) | Voc(V) | FF (%) | PCE (%) |
|---|---|---|---|---|
| 1:1 | 0.84 | 0.6 | 30.8 | 0.155 |
| 1:2 | 1.65 | 0.55 | 33 | 0.3 |
| 1:3 | 1.7 | 0.55 | 31 | 0.29 |
| 1:4 | 1.95 | 0.44 | 30.3 | 0.26 |

What is claimed is:

1. A polymer having a constituent unit comprising:

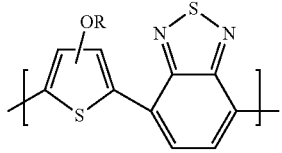

wherein said R is selected from a group consisting of an alkyl substituent, a substituted alkyl substituent, and a polyethyleneoxide chain; said OR moiety is connected to a carbon in said derivatized thiophene moiety selected from a group consisting of carbon-3 and carbon-4.

2. A polymer photovoltaic device comprising:
   a) an anode;
   b) a cathode;
   c) a polymer film sandwiched between said anode and cathode, wherein said polymer film contains:

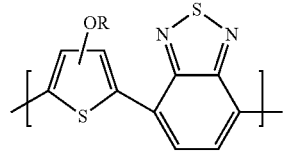

wherein said R is selected from a group consisting of an alkyl substituent, a substituted alkyl substituent, and a polyethyleneoxide chain; said OR moiety is connected to a carbon in said derivatized thiophene moiety selected from a group consisting of carbon-3 and carbon-4.

* * * * *